US011077804B2

(12) United States Patent
Kuschmeader et al.

(10) Patent No.: US 11,077,804 B2
(45) Date of Patent: Aug. 3, 2021

(54) FOLDABLE EQUIPMENT RACK

(71) Applicant: Kuat Innovations LLC, Springfield, MO (US)

(72) Inventors: Luke Kuschmeader, Springfield, MO (US); Aaron Houston, Springfield, MO (US); Jordan Bowles, Springfield, MO (US); Joshua Schwartz, Springfield, MO (US)

(73) Assignee: KUAT INNOVATIONS LLC, Springfield, MO (US)

( * ) Notice: Subject to any disclaimer, the term of this patent is extended or adjusted under 35 U.S.C. 154(b) by 0 days.

(21) Appl. No.: 16/777,233

(22) Filed: Jan. 30, 2020

(65) Prior Publication Data
US 2020/0238918 A1 Jul. 30, 2020

Related U.S. Application Data

(60) Provisional application No. 62/798,871, filed on Jan. 30, 2019.

(51) Int. Cl.
*B60R 9/048* (2006.01)
*B60R 9/08* (2006.01)

(52) U.S. Cl.
CPC .............. *B60R 9/048* (2013.01); *B60R 9/08* (2013.01)

(58) Field of Classification Search
CPC ........... B60R 9/08; B60R 9/045; B60R 9/048; B60R 9/04; Y10S 224/924
See application file for complete search history.

(56) References Cited

U.S. PATENT DOCUMENTS

| 1,807,104 | A | 5/1931 | Schat |
| 4,081,118 | A | 3/1978 | Mason |
| 4,261,496 | A | 4/1981 | Mareydt et al. |
| 5,516,017 | A | 5/1996 | Arvidsson |
| 5,951,231 | A | 9/1999 | Allen |
| 6,164,507 | A | 12/2000 | Dean et al. |
| 6,460,743 | B2 | 10/2002 | Edgerly et al. |
| 6,561,396 | B2 | 5/2003 | Ketterhagen |

(Continued)

FOREIGN PATENT DOCUMENTS

| DE | 10007078 A1 | 8/2001 |
| WO | 2013019815 A1 | 2/2013 |

OTHER PUBLICATIONS

"Rhino-Rack J-Style Kayak Carrier-Folding-Universal Mount"; https://www.etrailer.com/Watersport-Carriers/Rhino-Rack/S512.html; last accessed Apr. 13, 2020.

(Continued)

*Primary Examiner* — Brian D Nash
(74) *Attorney, Agent, or Firm* — Kutack Rock LLP; James H. Jeffries

(57) ABSTRACT

A rack is described for securing equipment, such as a kayak, to a vehicle. The rack has a base member, a support member, and a hinge assembly that pivotally connects the support member to the base member. The rack may be folded from an open configuration to a closed configuration. A handle or actuator on the base member may be operated to engage or disengage a latch mechanism to allow the hinge assembly to pivot or to be fixed to control the movement of the support member between desired positions in relation to the base member. The latch mechanism may comprise a shuttle assembly.

20 Claims, 32 Drawing Sheets

(56) References Cited

U.S. PATENT DOCUMENTS

| | | | |
|---|---|---|---|
| 6,868,998 B2 | 3/2005 | Dean | |
| 7,780,050 B2 | 8/2010 | Tucker | |
| 7,810,686 B2 | 10/2010 | Ilgenfritz | |
| 7,815,083 B2 | 10/2010 | Clausen et al. | |
| 8,136,708 B2 | 3/2012 | Sautter et al. | |
| D719,902 S | 12/2014 | Sautter et al. | |
| 9,067,522 B2 | 6/2015 | Laverack et al. | |
| 9,126,539 B2 | 9/2015 | Sautter et al. | |
| 9,156,410 B2 | 10/2015 | Wang | |
| 9,346,409 B2 | 5/2016 | Pfaeffli | |
| 10,384,587 B2 * | 8/2019 | Flaherty | B63B 32/70 |
| 2005/0077335 A1 | 4/2005 | Bourne | |
| 2006/0273122 A1 | 12/2006 | Bogoslofski et al. | |
| 2007/0119887 A1 * | 5/2007 | Foley | B60R 9/048 |
| | | | 224/324 |
| 2007/0164065 A1 | 7/2007 | Davis | |
| 2009/0120981 A1 * | 5/2009 | Sautter | B60R 9/08 |
| | | | 224/316 |
| 2009/0120982 A1 | 5/2009 | Sautter et al. | |
| 2014/0143990 A1 * | 5/2014 | Sautter | B60R 9/04 |
| | | | 24/68 CD |
| 2014/0144958 A1 * | 5/2014 | Sautter | B63B 32/80 |
| | | | 224/314 |
| 2014/0144959 A1 | 5/2014 | Sautter et al. | |
| 2014/0263503 A1 | 9/2014 | Laverack et al. | |
| 2015/0053732 A1 * | 2/2015 | Wang | B60R 9/045 |
| | | | 224/318 |
| 2015/0191127 A1 * | 7/2015 | Sautter | B60R 9/052 |
| | | | 224/331 |
| 2016/0068110 A1 | 3/2016 | Prescott et al. | |
| 2016/0185304 A1 | 6/2016 | Pedrini | |
| 2017/0028929 A1 | 2/2017 | Connors | |
| 2017/0267187 A1 * | 9/2017 | Rarey | B60R 9/048 |
| 2018/0015866 A1 | 1/2018 | Flaherty et al. | |
| 2019/0176714 A1 | 6/2019 | Marchlewski et al. | |
| 2019/0225163 A1 * | 7/2019 | Kuschmeader | B60R 9/08 |
| 2020/0324709 A1 | 10/2020 | Graif et al. | |

OTHER PUBLICATIONS

"1 Pair J-Bar Foldable Kayak Carrier Canoe Surf Ski Boat Snowboard Roof Top Mounter on Car SUV Crossbar"; http://web.archive.org/web/20151030020625/http://www.amazon.com/Foldable-Carrier-Snowboard-Crossbar-Capacity/dp/B013WLTBZI, archived Oct. 30, 2015, 3 pages.

International Search Report for International Application No. PCT/IB2017/053882, dated Oct. 17, 2017 (4 pages).

Written Opinion of the International Searching Authority for International PCT Application No. PCT/IB2017/053882, dated Jan. 18, 2018 (5 pages).

"International Search Report and Written Opinion for International Application No. PCT/US2021/013917, Search completed on Mar. 10, 2021, dated Apr. 7, 2021."

"International Search Report and Written Opinion for International Application No. PCT/US2021/013931, Search completed on Mar. 1, 2021, dated Mar. 10, 2021."

"KUAT Grip Ski and Snowboard Carrier Demonstration and Overview' {Rack Outfitters) Sep. 27, 2019 (Sep. 27, 2019) [online] retrieved from <URL: https://www.youtube.com/watch?v=IAvkITLSdtE> entire document, especially demonstration 1:15-1 :45".

* cited by examiner

FOLDABLE EQUIPMENT RACK

CROSS-REFERENCE TO RELATED APPLICATIONS

This application claims the benefit of U.S. Provisional Patent Application Ser. No. 62798871 filed Jan. 30, 2019, the disclosure of which is incorporated herein by reference.

BACKGROUND

This disclosure is in the field of equipment racks for use on vehicles. More specifically, this disclosure is in the field of foldable racks for kayaks, watercraft, and other sports equipment.

SUMMARY OF THE INVENTION

In various embodiments, the rack comprises a base member, a support member, and a hinge assembly that pivotally connects the support member to the base member. The rack may be folded from an open configuration to a closed configuration. A handle disposed in the base member may be actuated to allow the support member to be pivoted between desired positions.

DETAILED DESCRIPTION

Figure 1A:
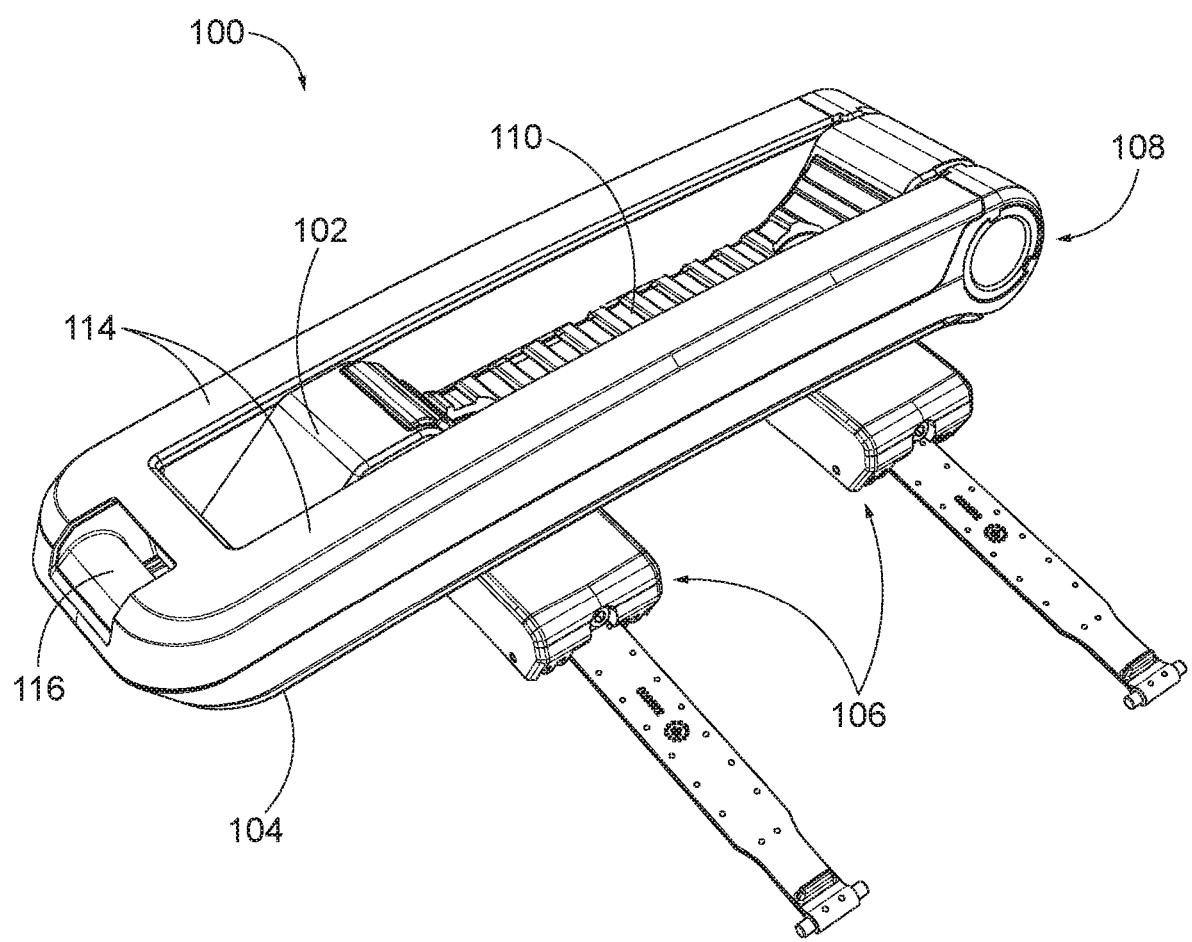
FIG. 1A is a perspective view of a first embodiment of the foldable equipment rack in a closed configuration.
Figure 1B:
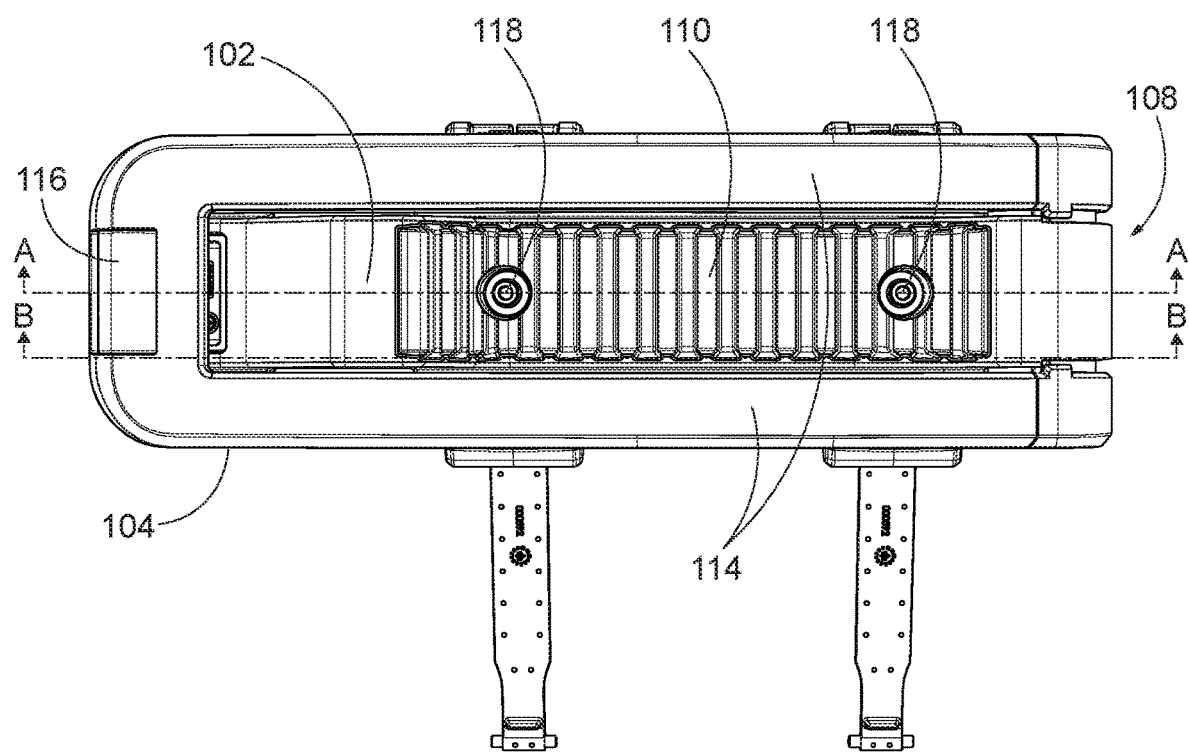
FIG. 1B is a top view of a first embodiment of the foldable equipment rack in a closed configuration.
Figure 1C:
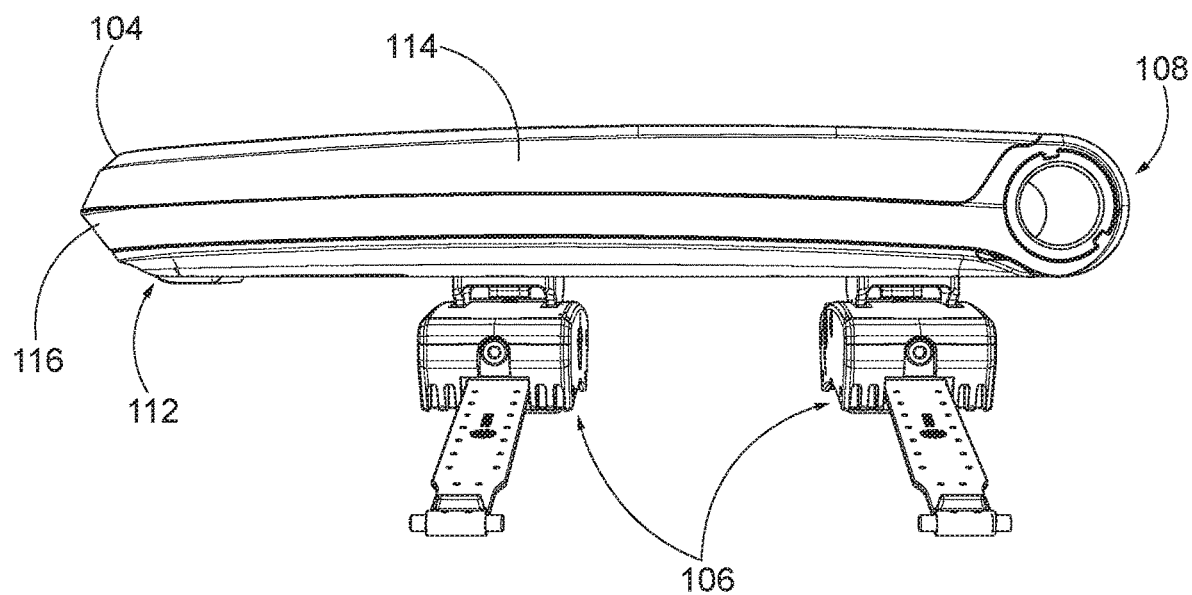
FIG. 1C is a side view of a first embodiment of the foldable equipment rack in a closed configuration.
Figure 1D:
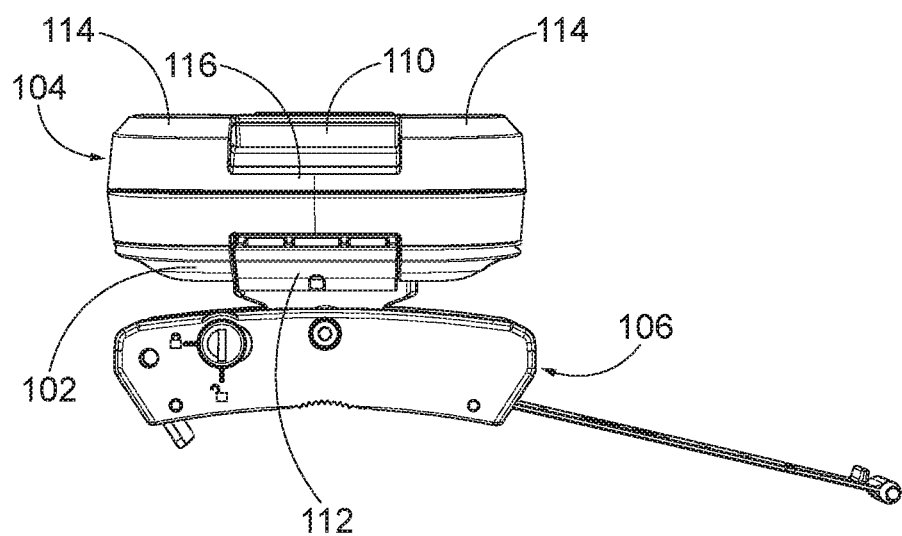
FIG. 1D is an end view of a first embodiment of the foldable equipment rack in a closed configuration.
Figure 1E:
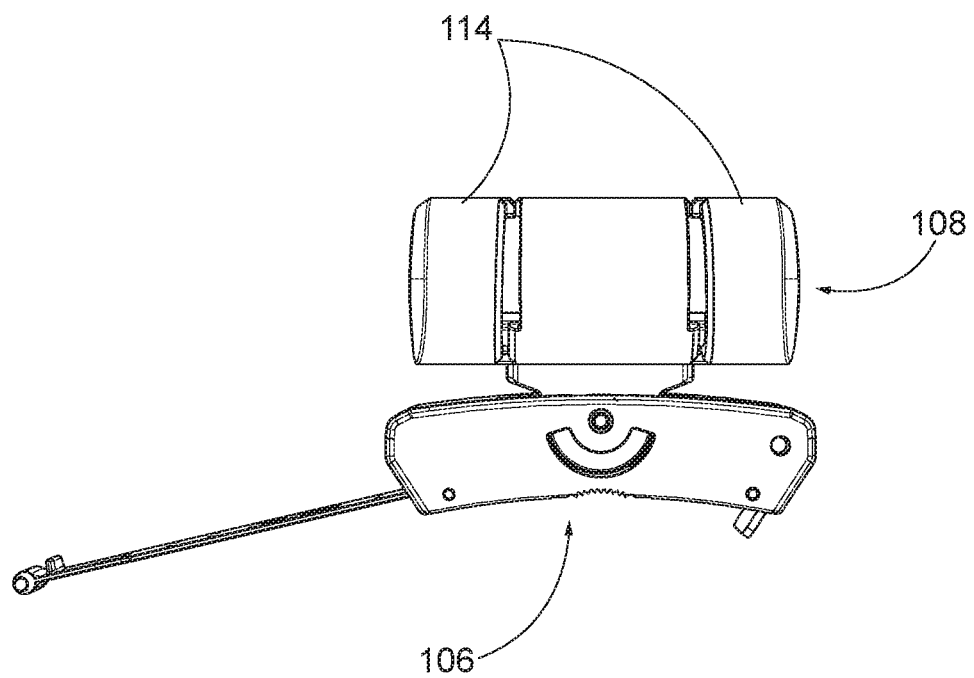
FIG. 1E is an end view of a first embodiment of the foldable equipment rack in a closed configuration.
Figure 1F:
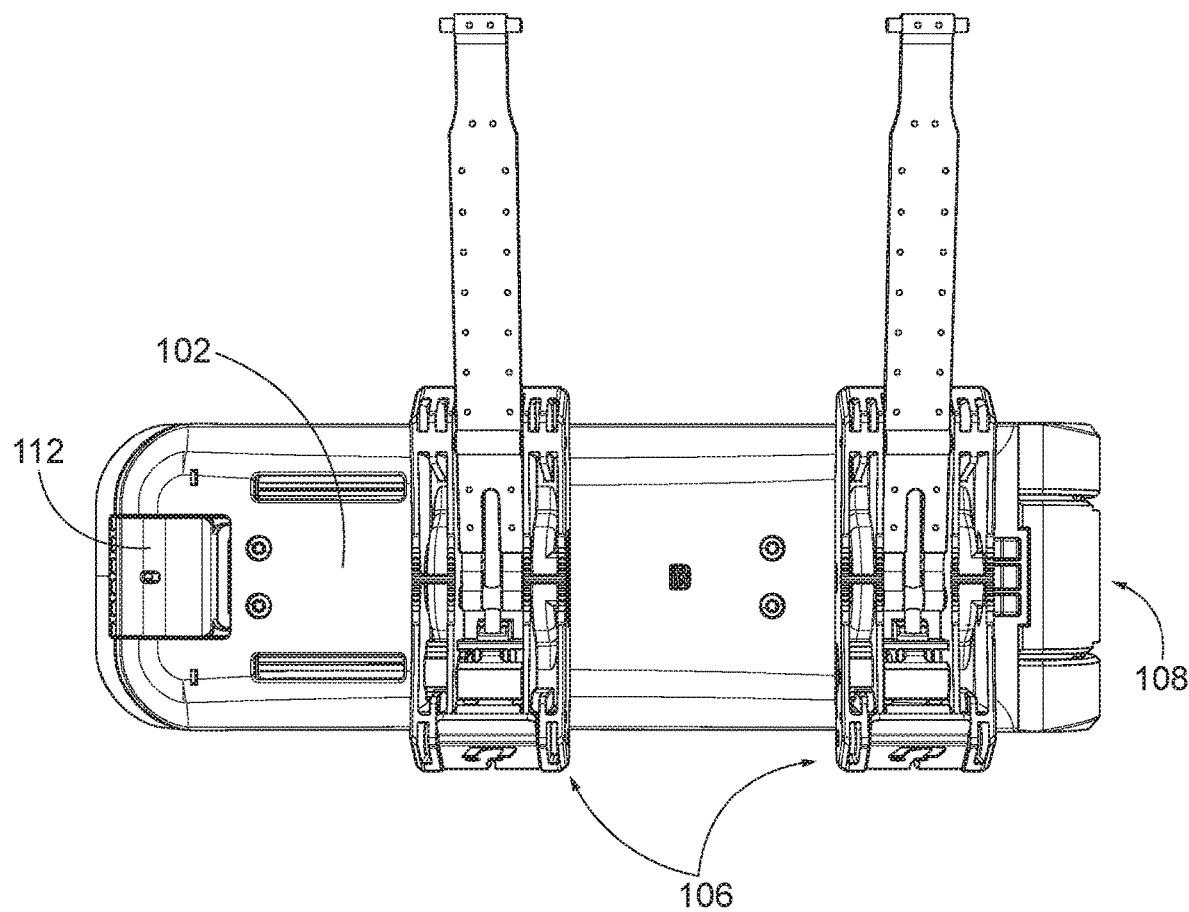
FIG. 1F is a bottom view of a first embodiment of the foldable equipment rack in a closed configuration.
Figure 2A:
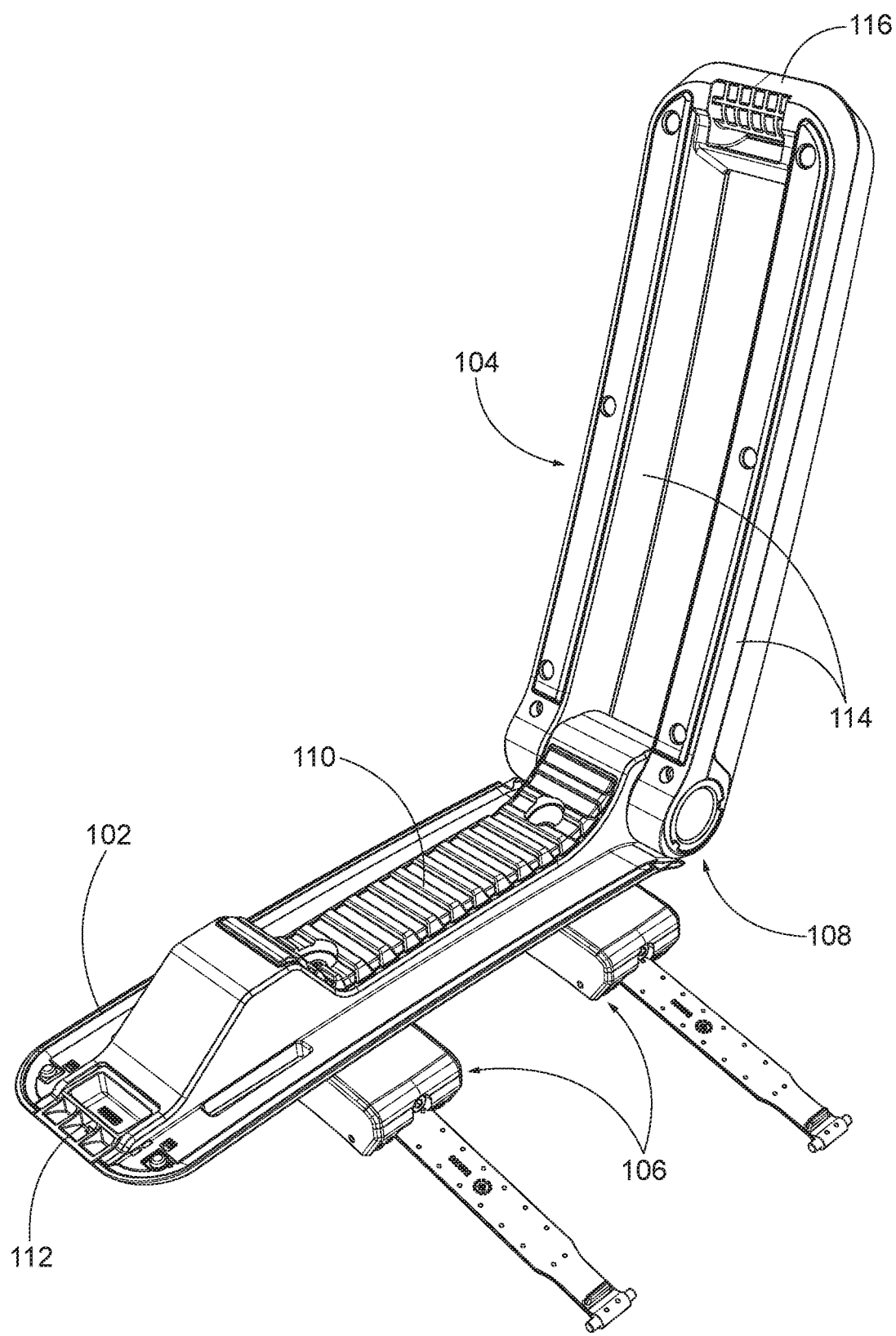
FIG. 2A is a perspective view of a first embodiment of the foldable equipment rack in an open configuration.
Figure 2B:
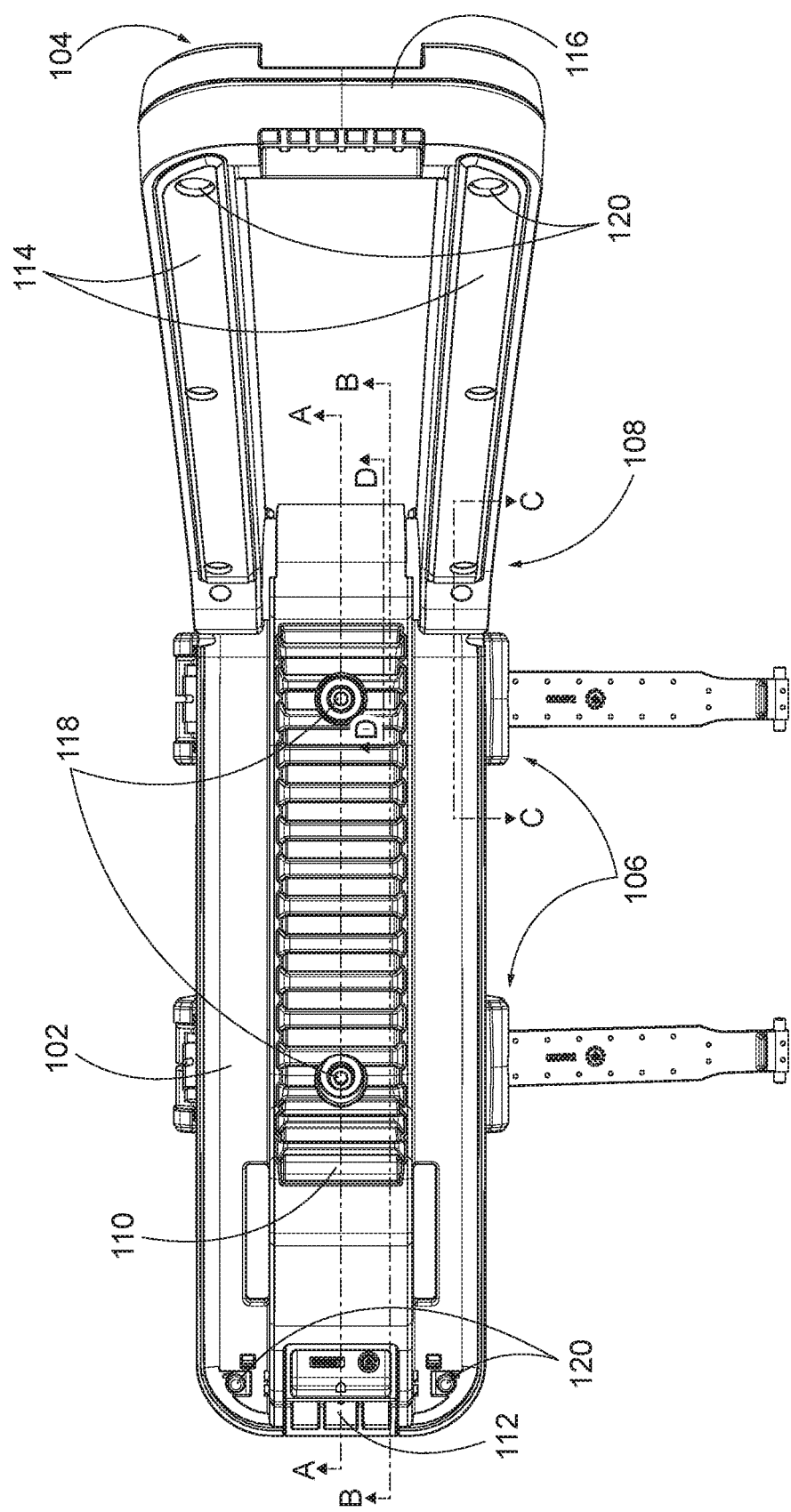
FIG. 2B is a top view of a first embodiment of the foldable equipment rack in an open configuration.
Figure 2C:
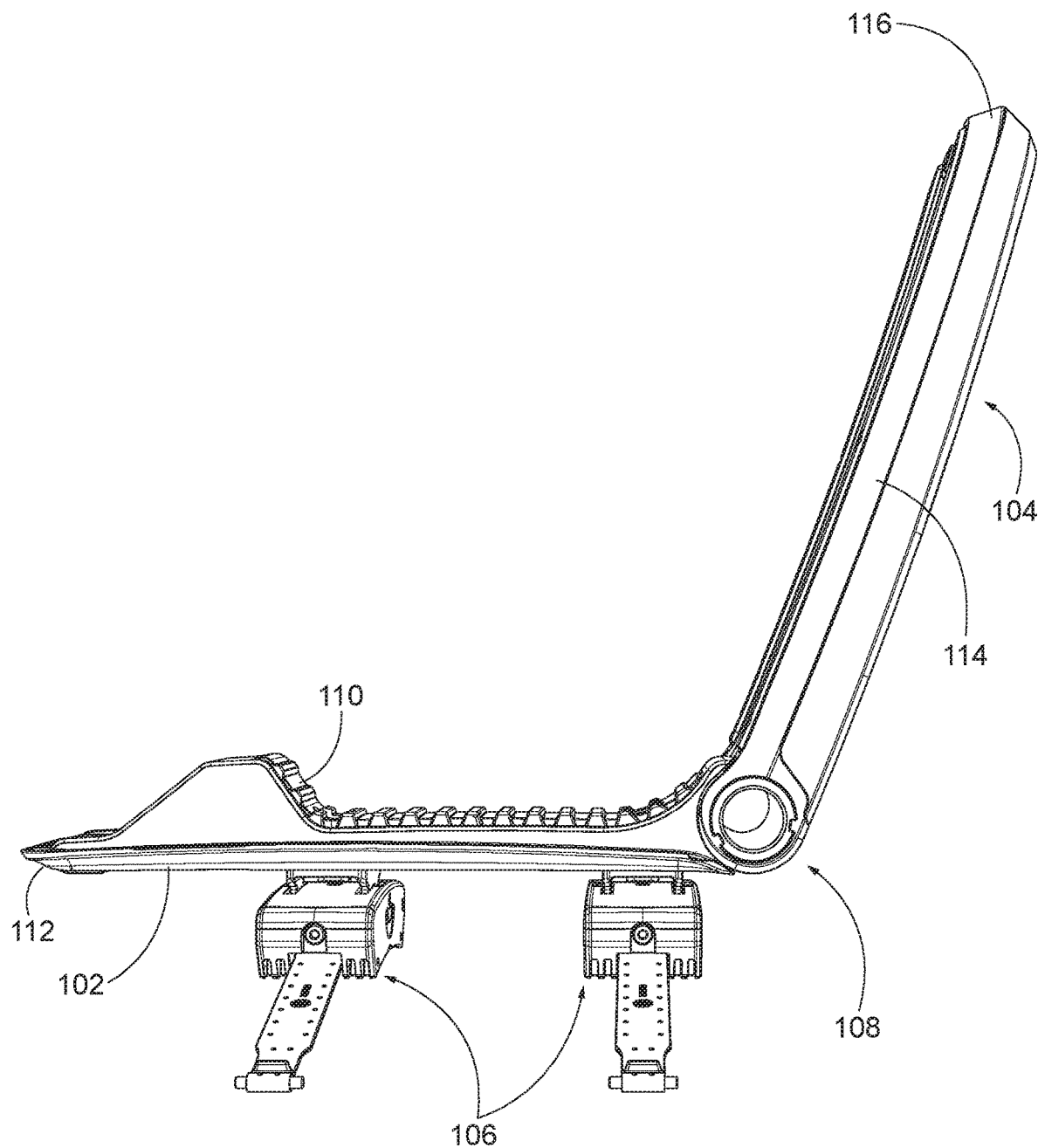
FIG. 2C is a side view of a first embodiment of the foldable equipment rack in an open configuration.
Figure 2D:
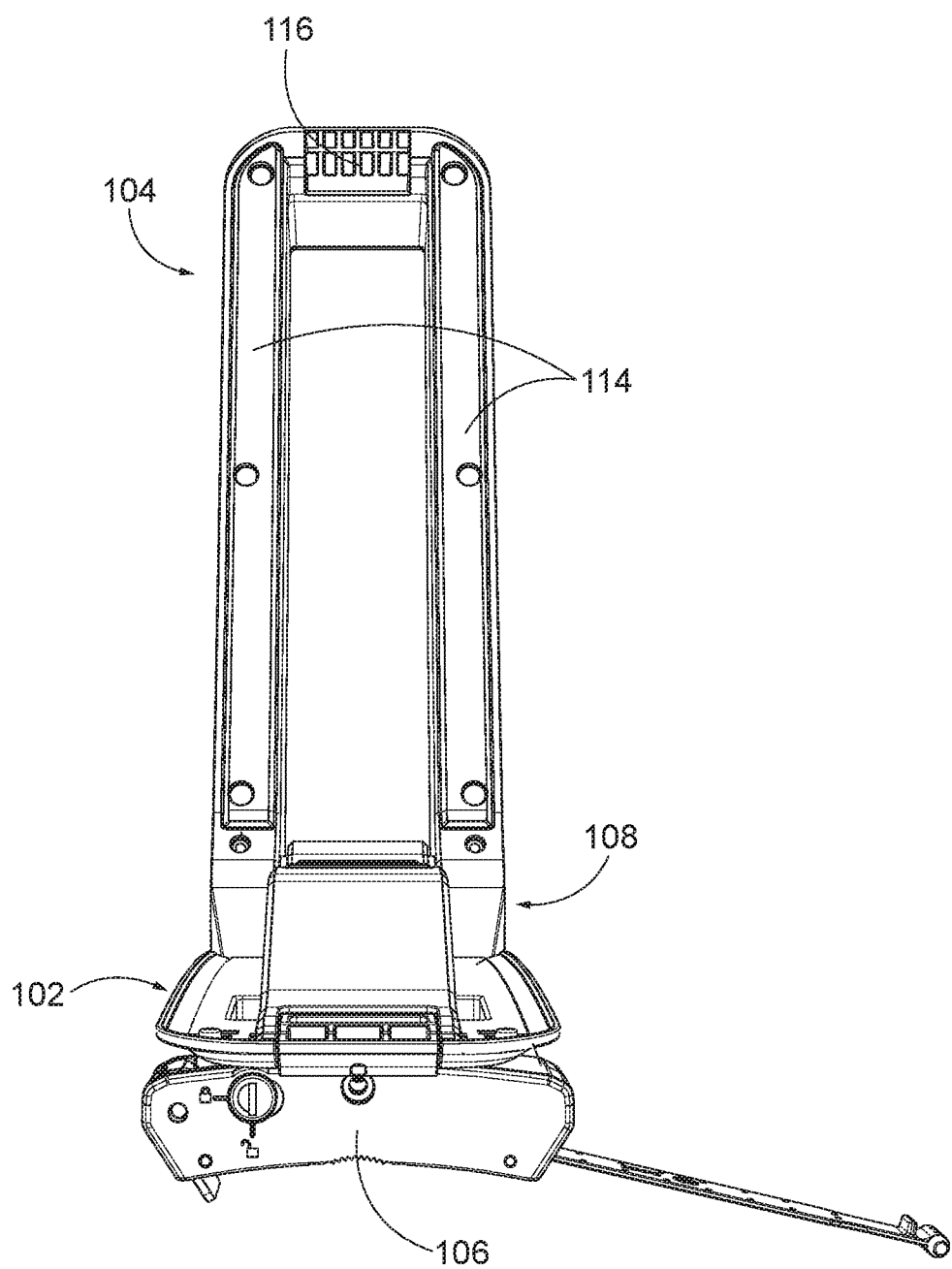
FIG. 2D is an end view of a first embodiment of the foldable equipment rack in an open configuration.
Figure 2E:
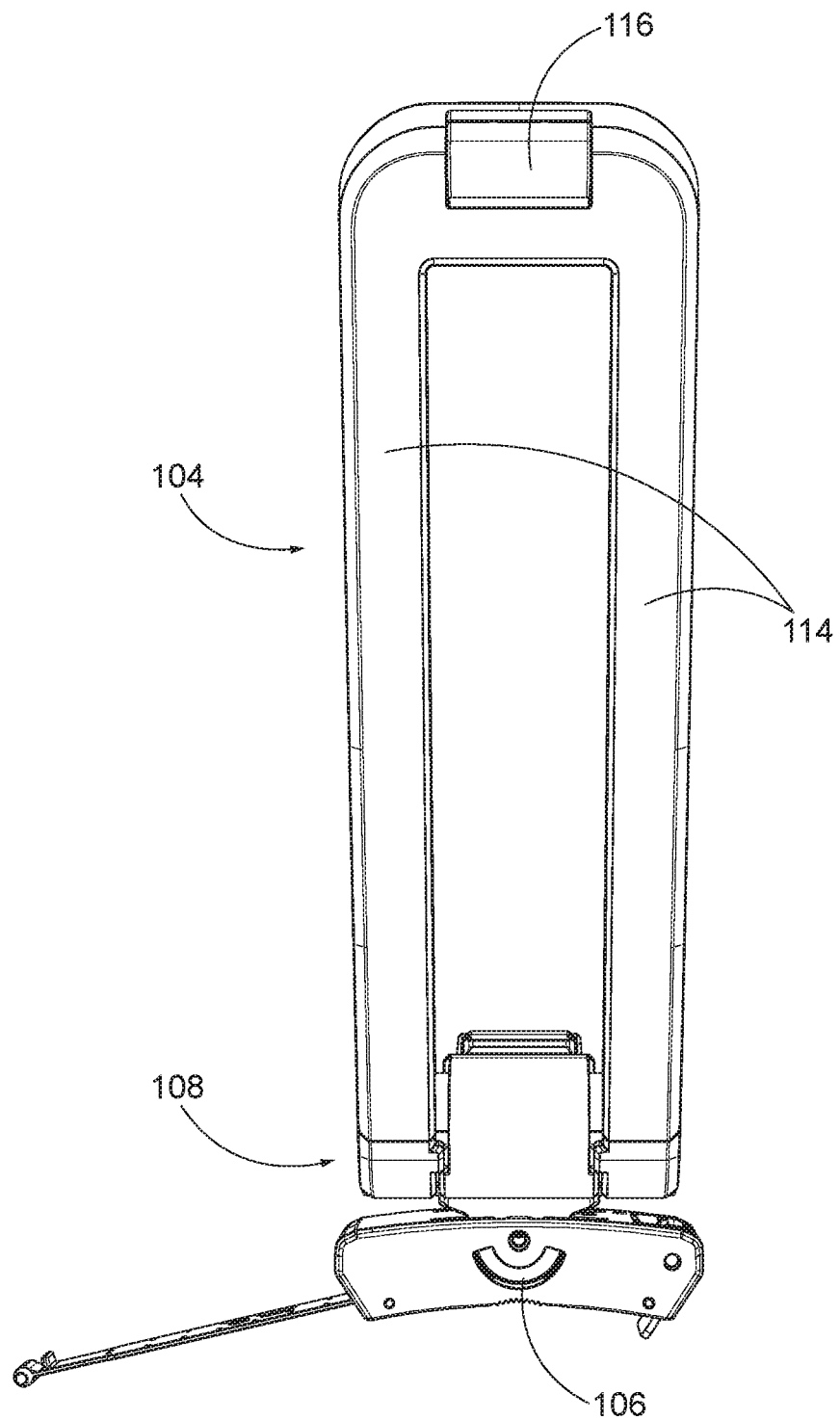
FIG. 2E is an end view of a first embodiment of the foldable equipment rack in an open configuration.
Figure 2F:
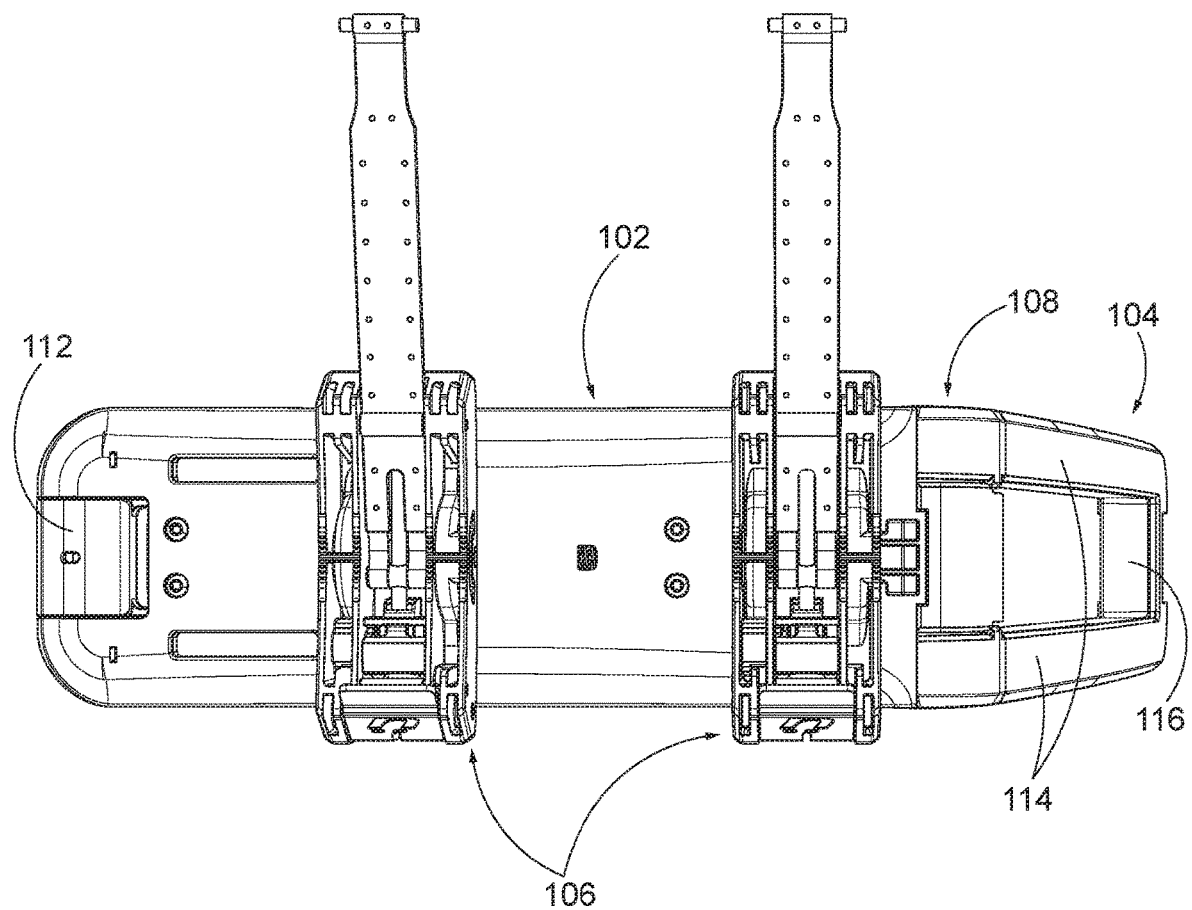
FIG. 2F is a bottom view of a first embodiment of the foldable equipment rack in an open configuration.
Figure 2G:
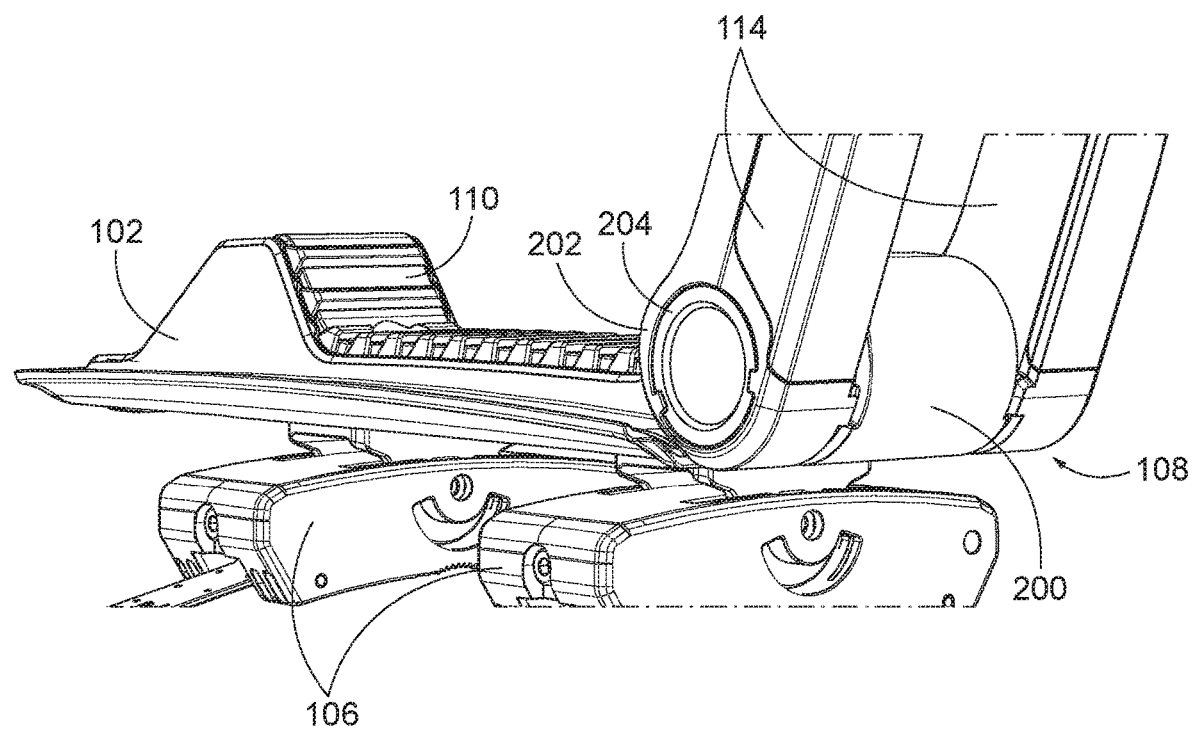
FIG. 2G is a detail perspective view of a portion of a first embodiment of the foldable equipment rack in an open configuration.

Many types of equipment racks are used to transport equipment, such as outdoor sporting equipment, on a vehicle such as a car, a truck, bus, van, or a sport utility vehicle, among others. These racks may be designed to carry different types of equipment such as bicycles, kayaks, skis, and others. It may be desired to leave such racks in place on a vehicle even when the rack is not in use to secure or transport a piece of equipment. The racks are often designed to support specific types of such equipment, and thus it may be inefficient, unsightly, and unsafe to leave the rack in its operating configuration while it is on the vehicle but not in use to secure or transport a piece of equipment.

As a result, it is often desirable to design equipment racks with an operational configuration and a stowed configuration. The operating configuration denotes the configuration of the rack when it is ready to receive and secure a piece of equipment onto the vehicle. The stowed configuration denotes the configuration of the rack when it is not in use to secure a piece of equipment.

In the inventive device described herein, the operational configuration, otherwise referred to as an open configuration, comprises the support member, or arm, 104 disposed at an angle greater than zero to the base member 102 so that a kayak, similar watercraft, or other sports equipment, may be placed, at least partially, on the base member 102 while leaning on or attached to the support member 104. The stowed configuration, otherwise referred to as a closed configuration, comprises the support member 104 pivoted downwardly so that it is adjacent to base member 102, to reduce wind resistance, prevent accidental damage to the rack, and provide a more appealing appearance of the rack on the vehicle.

Referring now to FIGS. 1A-1F a first embodiment of the foldable equipment rack is depicted in a closed or stowed configuration. Similarly, FIGS. 2A-2F depict the first embodiment of the foldable equipment rack in an open or operational configuration.

The depicted first embodiment of the rack 100 comprises a base member 102, a support member 104, and a hinge assembly 108 pivotally connecting the base member 102 and the support member 104. When in use, the rack 100 is mounted onto a vehicle for securing various types of equipment or other objects onto the vehicle during operation of the vehicle. In some embodiments, the rack 100 may be attached to the roof of the vehicle or to a roof rack attached to the roof of the vehicle. In the first embodiment depicted in the figures, at least one mounting device 106 is attached to the bottom of base member 102 for securing the rack 100 to the vehicle. Any mounting device capable of attaching the base member to the vehicle or other structure to which it is to be mounted may be used with the inventive rack 100. The exact type of mounting device 106 or method of attachment of the base member 102 is not limiting of the scope of the inventive device. The mounting device 106 is attached to the base member 102 by means such as mounting bolts 118, or other fastening devices known for this type of application.

In the first depicted embodiment, the hinge assembly 108 is attached to the base member 102 at a first end of the base member 102, while in other embodiments, the hinge assembly 108 may be attached to the base member 102 at a point along the length of the base member 102. The top surface of the base member 102 may be provided with an equipment support surface 110 formed into a shape and made of materials selected for use with the equipment or object which the rack 100 is designed to carry on the vehicle. For example, the shape of the equipment support surface 110 may be designed to accommodate the shape of a kayak as with the depicted embodiment, and the material selected for the surface 110 may have a high coefficient of friction to prevent or reduce the movement of any equipment placed on the rack 100. The depicted embodiment has a surface 110 that is in part a "cradle" shape to receive and securely hold a kayak or other watercraft in place on the base member 102. The surface 110 may also have features such as corrugations or other protrusions to increase the holding performance of the surface, or for aesthetic reasons.

In the first embodiment an actuator 112 is also provided on base member 102 for engaging (or latching) and disengaging (or unlatching) the hinge assembly 108 to prevent or allow, respectively, pivotal movement of the support member 104 with respect to the base member 102. In the first embodiment of the rack 100 depicted in FIGS. 1A-2F, the actuator 112 is disposed at or near a second end of base member 102, however in other embodiments it may be located along the length of base member 102 on its sides, top, or bottom surface. In varying embodiments, the actuator 112 may be accessible from above the base member 102, below the base member 102, from one or both sides of base member 102, or from any combination of the foregoing.

In the depicted embodiment, a user activates the actuator 112 by moving it in relation to the base member 102. In some embodiments the actuator 112 translates in a direction parallel to the length of the base member 102. In some embodiments, the actuator 112 is translated away from the hinge assembly 108 to disengage the hinge assembly 108 and allow the support member 104 to pivot with respect to base member 102. Conversely, in those embodiments, the actuator 112 is translated toward the hinge assembly 108 to engage the hinge assembly and prevent the support member 104 from pivoting with respect to base member 102. In other embodiments, the actuator 112 may be translated upwardly, downwardly, or to either side with respect to the base member 102, it may pivot or rotate with respect to the base member 102, or it may move tangentially or along an arc in any of the foregoing directions. In other embodiments, the actuator 112 may be a lever that is rotated, a button that is depressed, or any other type of actuator that may be used to manually actuate a mechanism.

In the first depicted embodiment, the support member 104 is attached at its first end to the hinge assembly 108. The hinge assembly 108 pivots to allows the support member 104 to pivot with respect to base member 102, but also to be latched and fixed in place at certain desired positions with respect to base member 102. The position of support member 104 shown in FIGS. 2A-2F is an embodiment of an open configuration during which the rack 100 may be utilized to carry equipment or other objects. The object carried on the rack may lean against or be secured to support member 104 as necessary. For example, a kayak held on the rack 100 may be supported on its side on equipment rest 110 with its top or bottom surface leaning against support member 104. Straps or other means of securing the kayak on the rack 100 may be attached to base member 102 and support member 104 to hold the kayak in place.

When the hinge assembly 108 is in the unlatched configuration, the support member 104 may be pivoted from the open configuration shown in FIGS. 2A-2F into a closed configuration shown in FIGS. 1A-1F. The closed position is useful for securing the rack 100 in place when not in use to carry an object. The closed position reduces wind resistance of the rack 100 on a moving vehicle, reduces the chance of damage to the rack 100, and provides an improved appearance for the rack 100 when not in use, among other benefits. The support member 104 may be held in the closed position by an engagement of the hinge assembly 108, by magnets or other catches between the support member 104 and the base member 102, or by gravity.

In the first depicted embodiment, support member 104 comprises two substantially parallel support arms 114. Each support arm 114 is attached at a first end to the hinge assembly, and at a second end to a handle 116. The depicted handle 116 provides a convenient point of manipulation for a user who desires to pivot the support member 104. Other embodiments of the support member 104 may comprise a single, unitary component, in the same shape as the depicted support member, or other shapes. Yet other embodiments may incorporate a support member 104 comprised of other structures formed from component parts. The exact structure of the support member 104 is not limiting of the scope of the claimed invention.

Figure 3A:
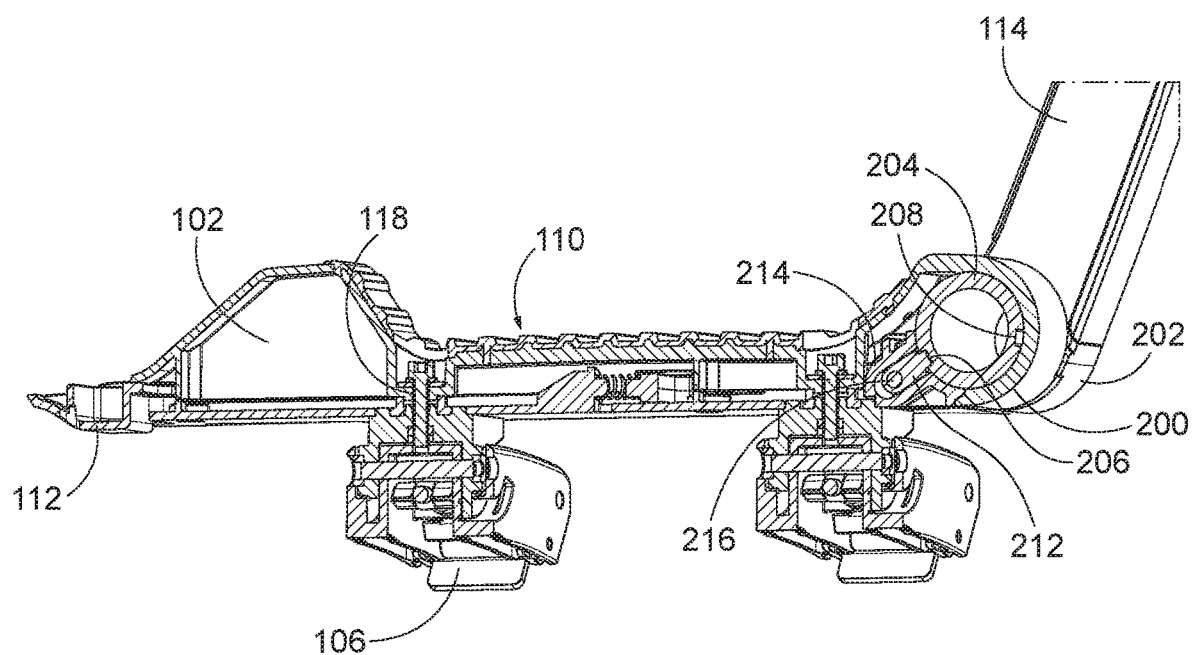
FIG. 3A is a cross-sectional view of a first embodiment of the foldable equipment rack in an open, latched configuration along axis A-A shown in FIG. 2B.
Figure 3B:
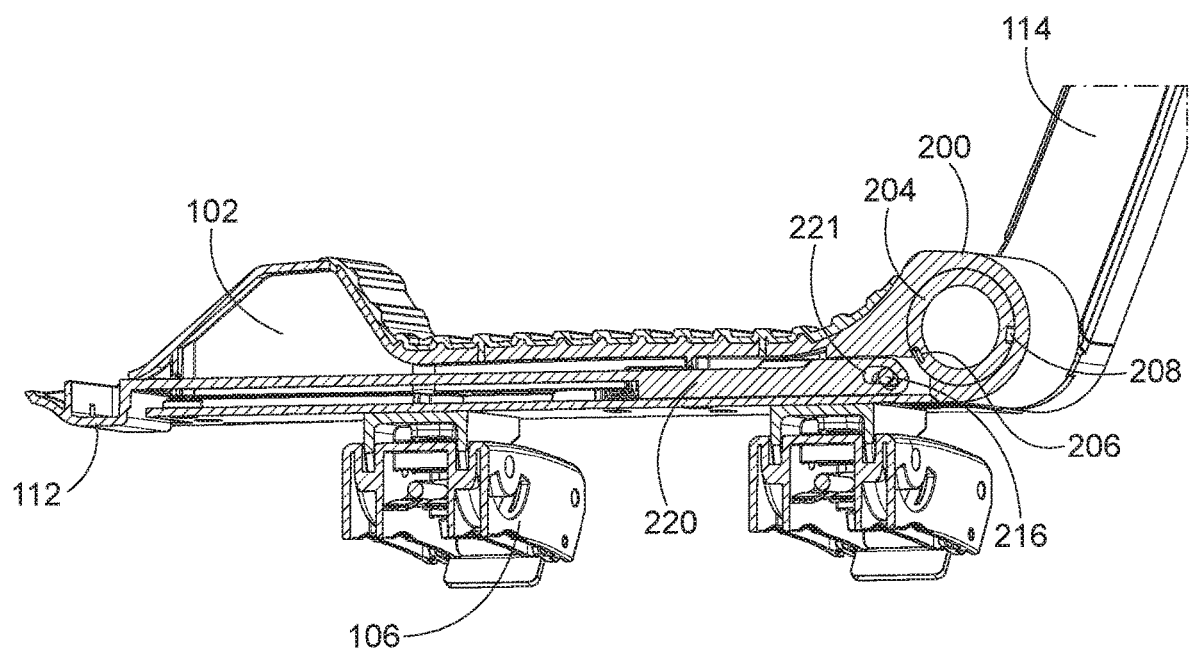
FIG. 3B is a cross-sectional view of a first embodiment of the foldable equipment rack in an open, latched configuration along axis B-B shown in FIG. 2B.

Referring now to FIGS. 3A-3D, cross-sectional views of the first embodiment of the rack are depicted in the open configuration with the hinge assembly 108 in a latched configuration. Similarly, referring now to FIGS. 4A-4B, cross-sectional views of the first embodiment of the rack are depicted in the closed configuration with the hinge assembly 108 in an unlatched configuration.

In the first depicted embodiment, the hinge assembly 108 comprises a first, or base, hinge barrel 200, at least one second, or support, hinge barrel 202, and a hinge cylinder 204. In this embodiment, the first hinge barrel 200 is attached to or formed unitarily with base member 102. Similarly, the at least one second hinge barrel 202 is attached to or formed unitarily with support member 104. The hinge barrels 200 and 202 are provided with an internal bore capable of receiving the hinge cylinder 204 so that the cylinder 204 is capable of rotating within at least one of the bores of the barrels 200 and 202. Hinge cylinder 204 may be a hollow cylinder, a solid cylinder, or hollow with end caps. In some embodiments, it may have a smaller or larger diameter then the depicted embodiment. In some embodiments, it may also have some segments that are non-cylindrical or differently sized then the rest of the hinge cylinder 204 so long as certain portions of the hinge cylinder are able to rotate within the bore of either first barrel hinge 200 or the second barrel hinge 202.

In some embodiments, portions of the rack 100, such as hinge assembly 108, may be formed unitarily with or permanently joined to other parts of the rack 100, such as base member 102 or support member 104. For example, first hinge barrel 200 may be formed as part of base member 102, and the second hinge barrel 202 may be formed as part of support member 104. In other embodiments, the hinge assembly 108 may be a separate assembly formed apart from and later attached to the other components of the rack 100. The scope of the claims herein covers any methods of forming the components of the rack 100, whether some comprise unitary components of a device that form more than one element of the claimed invention or not.

As will be discussed further below, during rotation of the hinge assembly 108 the cylinder hinge 204 only rotates with respect to either the base member 102 or the support member 104. Therefore, only one bore in either barrel hinge 200 or barrel hinge 202 need be cylindrical or otherwise as necessary to allow for pivotal movement. The other bore may be non-cylindrical in cross-section. In the depicted embodiment, both bores in both barrel hinges 200 and 202 are cylindrical, though that is not required in all embodiments because the cylindrical hinge may be fixed in relation to one of either base member 102 or support member 104. In some embodiments the cylinder hinge 204 may be formed as part of the member to which it has a fixed relationship.

Figure 3C:
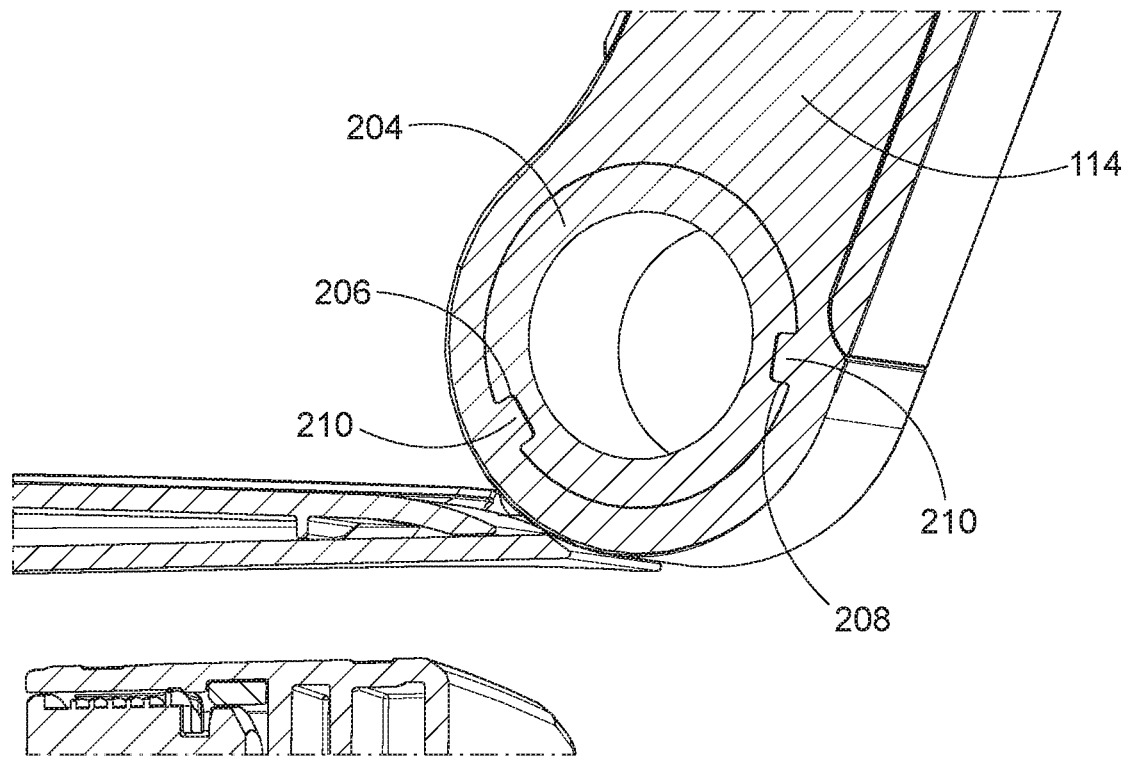
FIG. 3C is a cross-sectional view of a first embodiment of the foldable equipment rack in an open position along axis C-C shown in FIG. 2B.
Figure 3D:
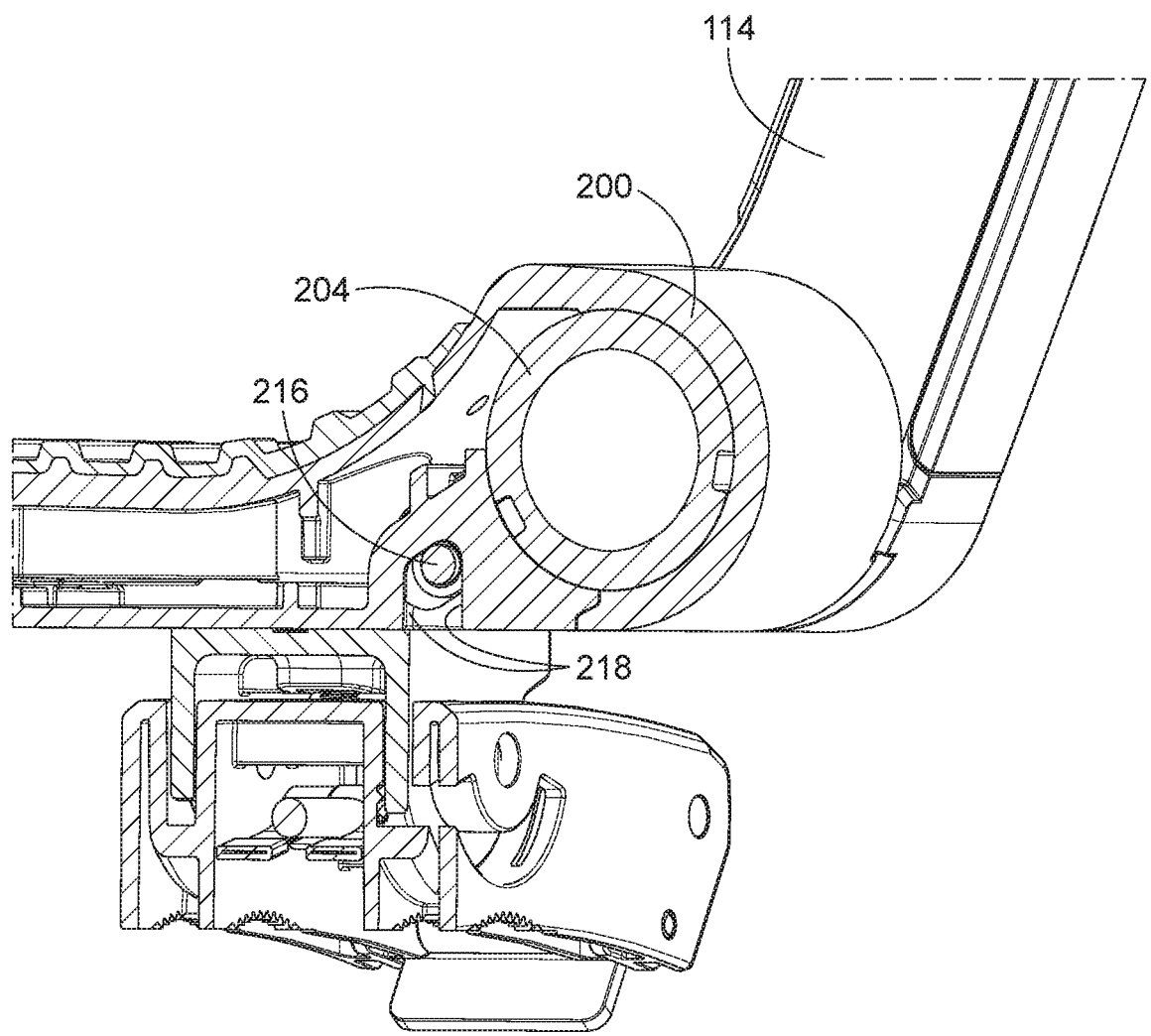
FIG. 3D is a cross-sectional view of a first embodiment of the foldable equipment rack in an open position along axis D-D shown in FIG. 2B.

As can be seen most clearly in FIG. 3C, in the first depicted embodiment the inner surface of the second hinge barrel 202 is provided with at least one key 210 to engage at least one keyway (or groove) 206 in hinge cylinder 204, thus fixing the relative position of the support member 104 and the hinge cylinder 204. Thus, in this depicted embodiment, as support member 104 pivots with respect to base member 102, the hinge cylinder 204 rotates in the bore in first barrel hinge 200. In other embodiments the hinge cylinder 204 may be fixed in relation to the support member 104 by bolts, screws, adhesives, non-circular cross-section, or any other method of fixing the adjacent portions of the hinge cylinder 204 and the second hinge barrel 202.

In the first depicted embodiment, the hinge assembly 108 may latch the support member 104 in only a single open position. In other embodiments the hinge assembly 108 may provide latching of the support member 104 in the closed position or at a plurality of other angles relative to the base member 102 as may be desired or best for use storing and transporting various types of kayaks, canoes, or other equipment.

In the first depicted embodiment, the hinge assembly 108 is provided with a retracting key 212 for selectively engaging the groove 206. The cylinder hinge 204 cannot rotate in the bore of hinge barrel 200 when the key 212 is inserted into the groove 206 because the body of the key 212 is held in place by the base member 102, and thus the support member 104 is held in a desired position. Conversely, the cylinder hinge 204 is capable of rotating with respect to the base member 102 when the key 212 is retracted from the groove 206, and thus support member 104 is capable of pivoting in either direction with respect to the hinge barrel 200.

The key 212 in the depicted embodiment translates in and out along a line that is parallel to a radius of the circular cross-section of hinge cylinder 204. In other embodiments, the key 212 may translate along a line that is not a radius of that circle or may even move in a non-linear manner. In the depicted embodiment, when the key 212 is inserted into the groove 206, rotational forces on the support arm 104 may increase the security of the latching effect due to shear or compression forces from one side of groove 206 pressing against a side of key 212 and further preventing it from being retracted from groove 206.

Figure 4A:
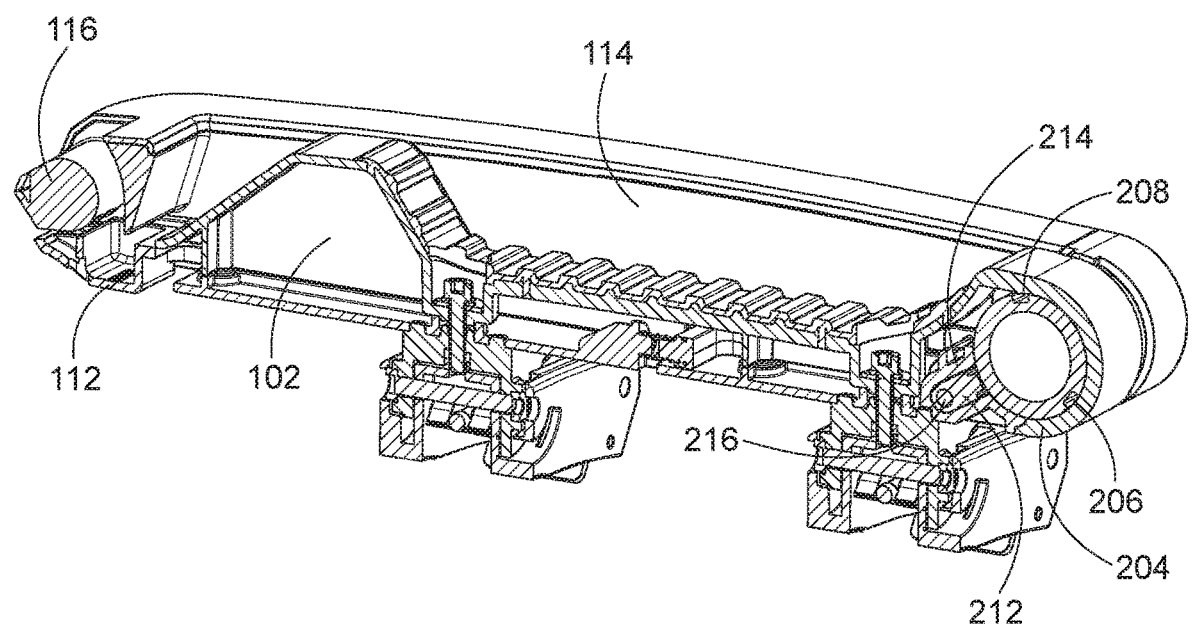
FIG. 4A is a cross-sectional view of a first embodiment of the foldable equipment rack in a closed, unlatched configuration along axis A-A shown in FIG. 1B.
Figure 4B:
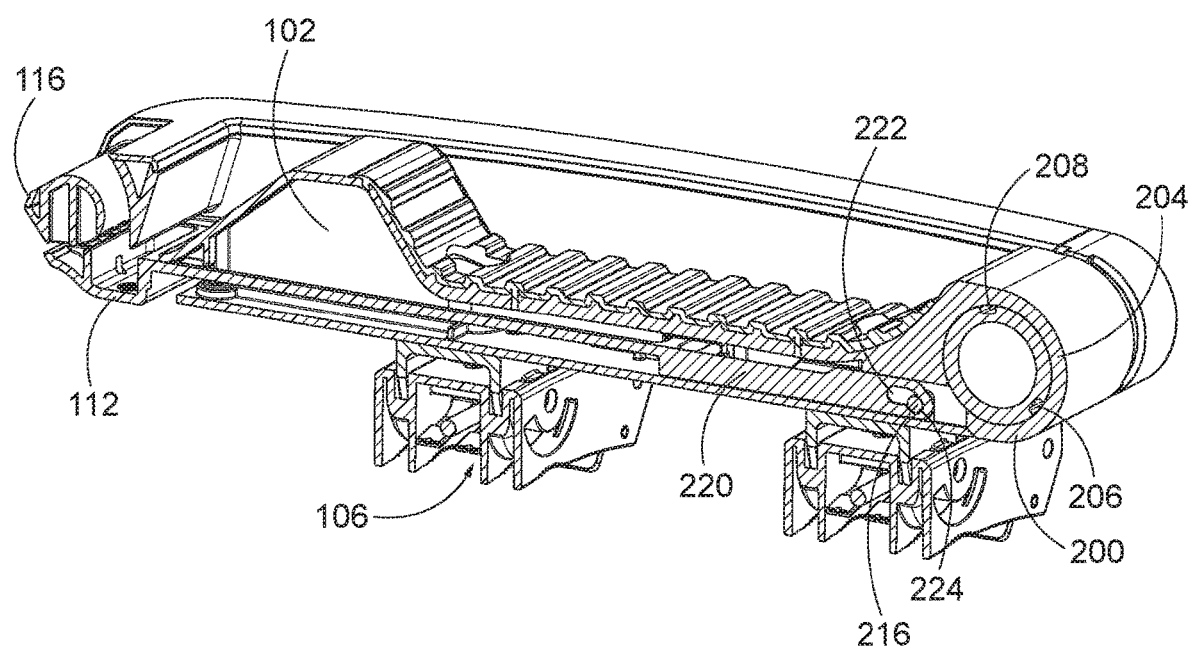
FIG. 4B is a cross-sectional view of a first embodiment of the foldable equipment rack in a closed, unlatched configuration along axis B-B shown in FIG. 1B.
Figure 5A:
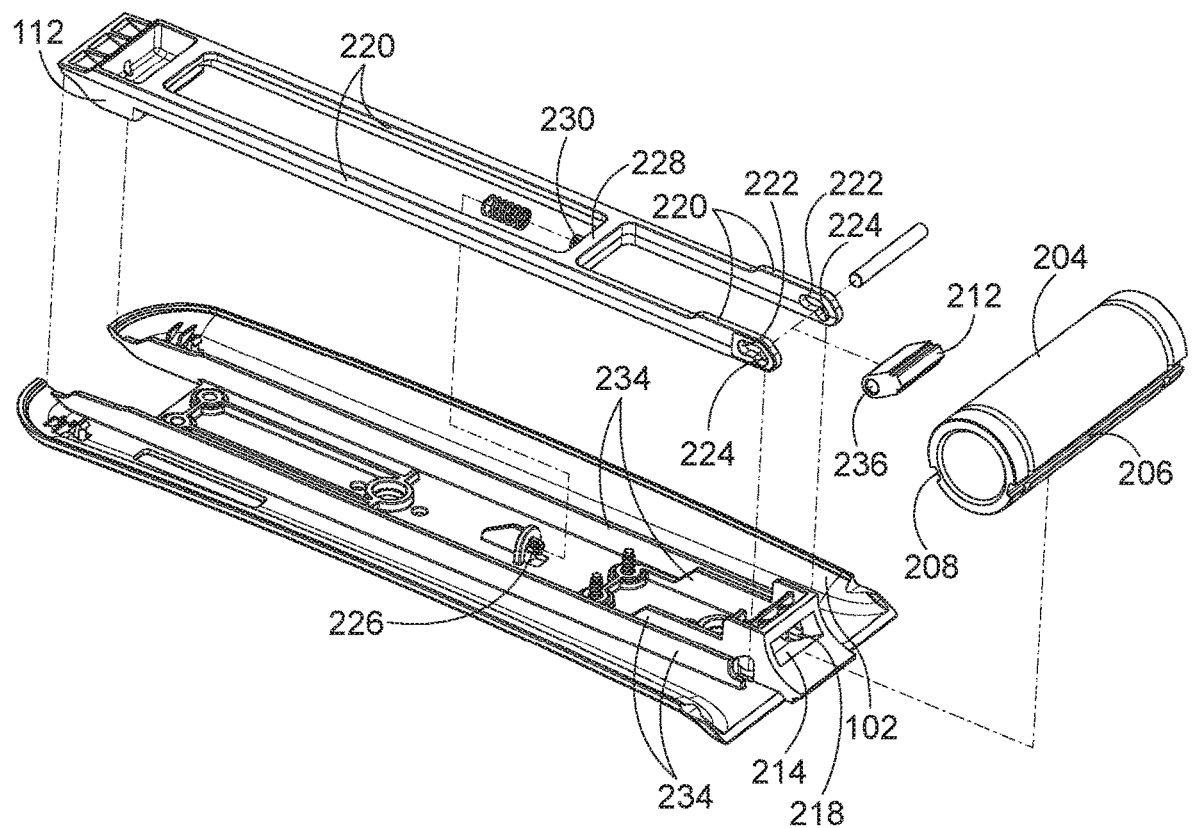
FIG. 5A is an exploded view of a portion of a first embodiment of the foldable equipment rack.
Figure 5B:
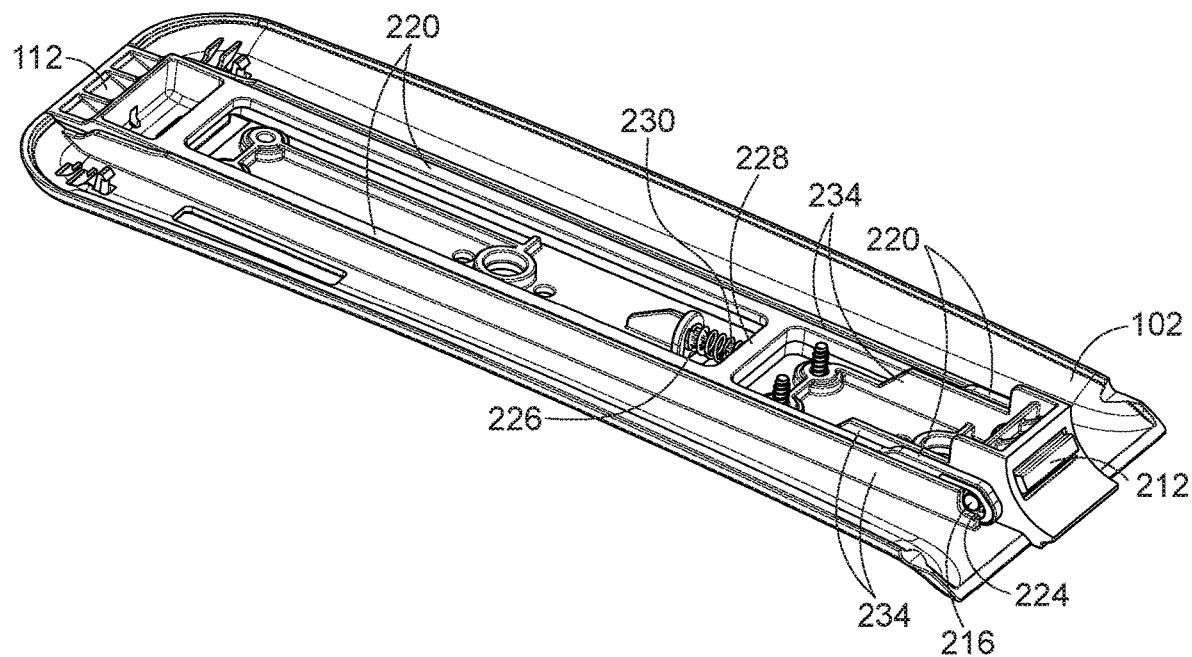
FIG. 5B is a cutaway view of the base member of a first embodiment of the foldable equipment rack.

In the first depicted embodiment, the retracting key 212 is disposed in a key receptacle 214 provided in hinge assembly 108 or as part of base member 102 adjacent to hinge assembly 108. The key receptacle 214 positions the key 212 at the correct angle for insertion into the groove 206 and allows it to translate in and out of the base member 102 as necessary for full insertion and retraction of the key 212 from the groove 206. FIG. 3A depicts the key 212 inserted into the groove 206 of the first embodiment. FIG. 4A depicts the key 212 retracted out of groove 206 of the first embodiment.

In the first depicted embodiment, the key 212 is linked to an actuator arm 220 disposed in, on, or around base member 102. In the depicted embodiment, key 212 is provided with a bore 236 for receiving a pin 216. The pin 216 may or may not spin within the bore and extends laterally to one or both sides of the key 212. The extending portion or portions of the pin 216 engages one or more slots 221 in actuator arm 220 so that the actuator arm 220 is able to exert a force on key 212 via pin 216 causing the key 212 to translate into or out of groove 206. In some embodiments, the key receptacle 214 is provided with an opening 218 to allow the extending portion of pin 216 to extend out of key receptacle 214 and engage slot 221 in actuator arm 220. In some embodiments, the actuator arm 220 may attach to a medial point on key 212. In other embodiments, the pin 216 may be replaced by protrusions or detents extending from key 212, either laterally outward or inwardly on a medial notch or indentation in key 212.

In the first depicted embodiment, actuator arm 220 is disposed in base member 102 and slidably retained by guide structures 234. In this embodiment the actuator arm 220 has two members that extend to either side of the key 212, though in some cases only a single member will extend to link with the key 212 at a medial or lateral point on the key 212. The exact depiction of the guide structures is not limiting of the invention but depicts an embodiment thereof. The actuator arm 220 is retained in, on or by base member 102 in a manner that allows it to translate in and out along the axis of the base member 102 toward and away from the hinge assembly end. In the first depicted embodiment an actuator handle 112 is provided on the actuator arm 220 to allow a user to pull or push the actuator arm 220 in or out as desired. The actuator arm 220 is preferentially longitudinally rigid so that a force on the handle 112 will be transmitted by actuator arm 220 and will be exerted on the key 212 through pin 216.

The depicted actuator arm 220 has two members that extend substantially parallel along the length of the actuator arm 220. In other embodiments, the actuator arm 220 may have more or less lengthwise members. The depicted actuator arm has a cross member 228 that connects the two lengthwise members, and the actuator 112 also connects the two lengthwise members. In other embodiments, more or fewer cross members may be provided.

In the first depicted embodiment at some point along the length of the members of the actuator arm 220, a slot 221 is provided for receiving the extending portion of pin 216. The shape of the slot 221 is designed to apply a force to the key 212 to cause it to retract from groove 206 when the actuator handle 112 is pulled by a user. In some embodiments, the slot 221 may also be designed to apply a force on key 212 causing to insert into groove 206 or to be disposed against the outer surface of hinge cylinder 204 when the actuator handle 112 is not pulled or is pushed by a user. The exact geometry of the slot 221 varies in different embodiments of the rack 100, and the depicted embodiment is not limiting thereof.

In the first depicted embodiment, the slot 221 has a longitudinal section 222 and an angled section 224. When pin 216 is disposed in the longitudinal section 222 of the slot 221, the actuator 112 and actuator arm 220 may move in and out without exerting a force on pin 216 or key 212. The angled section 224 of slot 221 is angled with respect to the direction of translation of the arm 220, so that when actuator arm 220 is translated away from the hinge assembly 108, slot 221 moves past pin 216 until pin 216 is in the angled section 224. As the actuator arm 220 continues to translate away from the hinge assembly 108, the inner edge of angled section 224 exerts a force on pin 216 that causes pin 216 to move away from hinge cylinder 204 thus pulling key 212 away from cylinder hinge 204 and out of groove 206, if it was inserted therein.

In various embodiments of the rack, a biasing force will be applied to the actuator arm 220 so that when a user does not exert a force to retract the actuator arm 220 away from the hinge assembly 108, the actuator arm 220 will be urged in the direction of the hinge assembly 108. In the depicted embodiment the biasing force is provided by compression spring 232 disposed between first and second spring retainers 226 and 228 respectively. In the first depicted embodiment, the spring retainer 226 is fixed to the base member 102 and the spring retainer 230 is attached to cross-member 228 of actuator arm 220. Other biasing means may also be utilized in place of the spring and spring retainers. In some embodiments the biasing force may be applied to directly key 212 or to both key 212 and actuator arm 220.

In the first depicted embodiment, when the handle is released by the user, spring 232 exerts a force on the actuator arm 220 to translate it towards hinge assembly 108, causing the outer edge of angled section 224 of slot 221 to push pin 216, thus pushing key 212 towards hinge cylinder 204, and into groove 206 if it is aligned with key 212. In some embodiments of the rack 100, the actuating arm 220 or actuator 112 may be attached to other members or components that allow a user to actuate the release mechanism (retracting key 212) by lifting up or pushing down on the other members, instead of pulling outwardly on actuator 112.

In some embodiments, the movement of the pin 216 into a certain portion of the slot 221 prevents it from allowing the key 212 to retract out of the groove 206. In the depicted embodiment, the longitudinal section 222 is positioned so that the lower edge of that section of the slot 221 will not allow pin 216 to move in a direction that is away from the hinge cylinder 204. Since the pin 216 is prevented from moving away from hinge cylinder 204, the key 212 is also not able to move outwardly from the hinge cylinder 204 and the key 212 is forced to stay in groove 206. This holds the key 212 in the groove 206 and prevents rotation of the hinge cylinder unless the arm 220 is translated outwardly, away from hinge assembly 108.

In the first depicted embodiment, when a user retracts actuator handle 112 away from hinge assembly 108 then actuator arm 220 moves in the same direction, and the second spring retainer 230 on cross member 228 moves closer to the first spring retainer 226 affixed to base member 102, thus compressing spring 232. When the user releases the pulling force from the actuator 112, spring 232 forces cross member 228 and thus actuator arm 220 to move back towards the hinge assembly as far as possible, thus either inserting key 212 into groove 206 or causing the end of key 212 to press against the outside surface of hinge cylinder 204. When the end of key 212 is pressed against the outside of hinge cylinder 204, the support arm 104 and hinge cylinder 204 may still be able to pivot or rotate in relation to base member 102. Once the support arm 104 is pivoted to a position where the key 212 aligns with groove 206 then the key 212 will be pushed into groove 206 by the force of spring 232.

In some embodiments, one or more magnetic catches 120 may be utilized to hold the support member 104 in the closed configuration. The magnetic catches 120 may comprise a catch magnet 122 disposed in either base member 102 or support member 104, and another catch magnet 122 or a catch plate 124 disposed on the area of the other member 102 or 104 that is adjacent thereto when in the closed configuration thereby causing a magnetic force to hold the support member 104 in the closed configuration.

Referring now to FIGS. 6A through 7B a second embodiment of the inventive folding rack is depicted. In this embodiment, the rack 100 comprises a similar base member 102, support member 104, and hinge assembly 108, however an alternative mechanism is utilized to allow a user to engage and disengage the latch mechanism. In these figures the mounting devices 106 have been removed for visibility, but mounting bolts 118 indicate typical locations for rack mounting hardware.

In this second embodiment, an actuator 300 is provided on the bottom of the base member 102 to allow a user to release or disengage the latch mechanism in the rack 100. In this embodiment the actuator 300 is pivotally connected to a traveling pin 302, which may comprise a bolt or similar fastener, which extends through slot 306 in base member 102. In other embodiments of the equipment rack, the actuator 300 may be fixedly attached to or unitarily formed with the traveling pin 302. In some embodiments the actuator 300 may be a part of or attached to the shuttle assembly described in relation to later figures.

In the depicted second embodiment the actuator 300 may be operated by applying a force substantially in the direction of the distal end 308 of the base member 102 on either end 300a or 300b of the lever actuator 300. In this embodiment one or more fulcrum features 304 are provided on the bottom of base member 102, which may provide a pivot point for the pivotal movement of actuator 300. The features 304 may be members, protrusions, or tabs extending outwardly from the bottom of base member 102. In other embodiments, the fulcrum features 304 could comprise grooves or slots in the base member 102 for receiving a member, protrusion, tab, or portion of lever actuator 300.

Figure 6A:
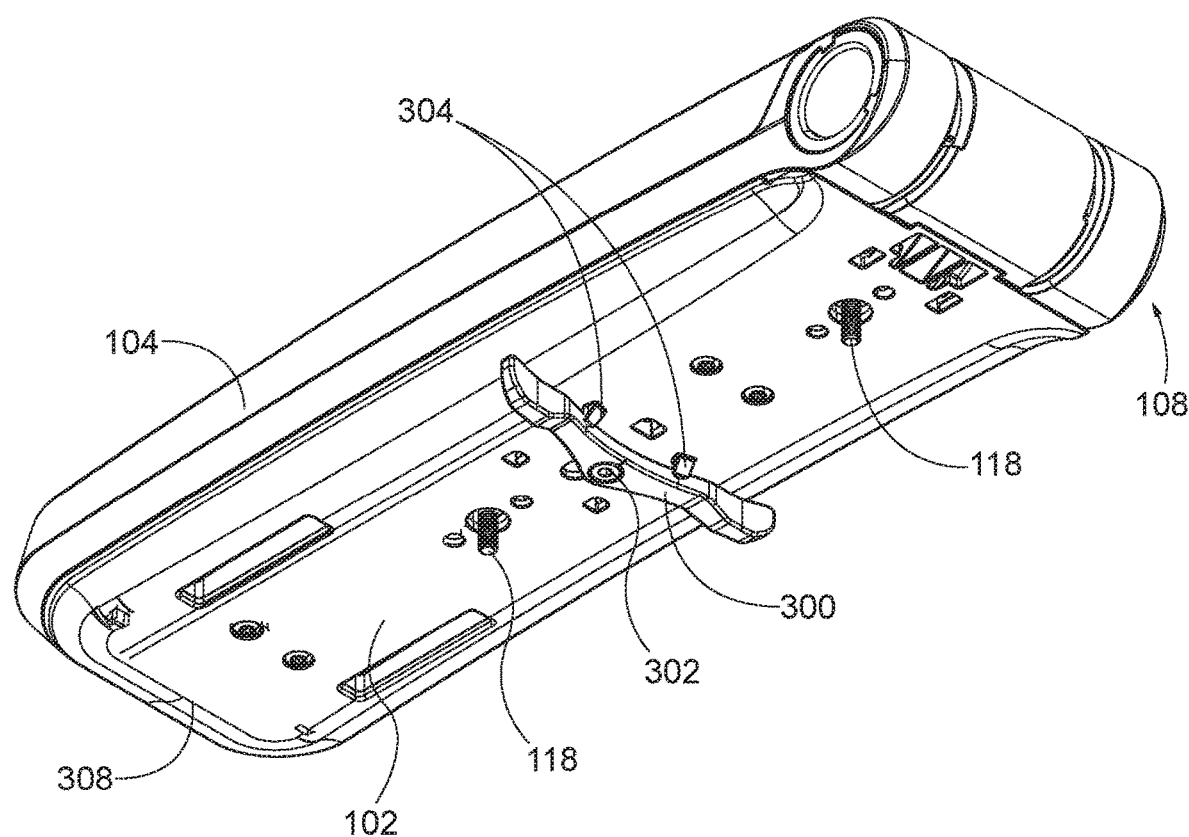
FIG. 6A is a perspective view of a second embodiment of the equipment rack in a closed configuration with the latch actuator in the released position.
Figure 6B:
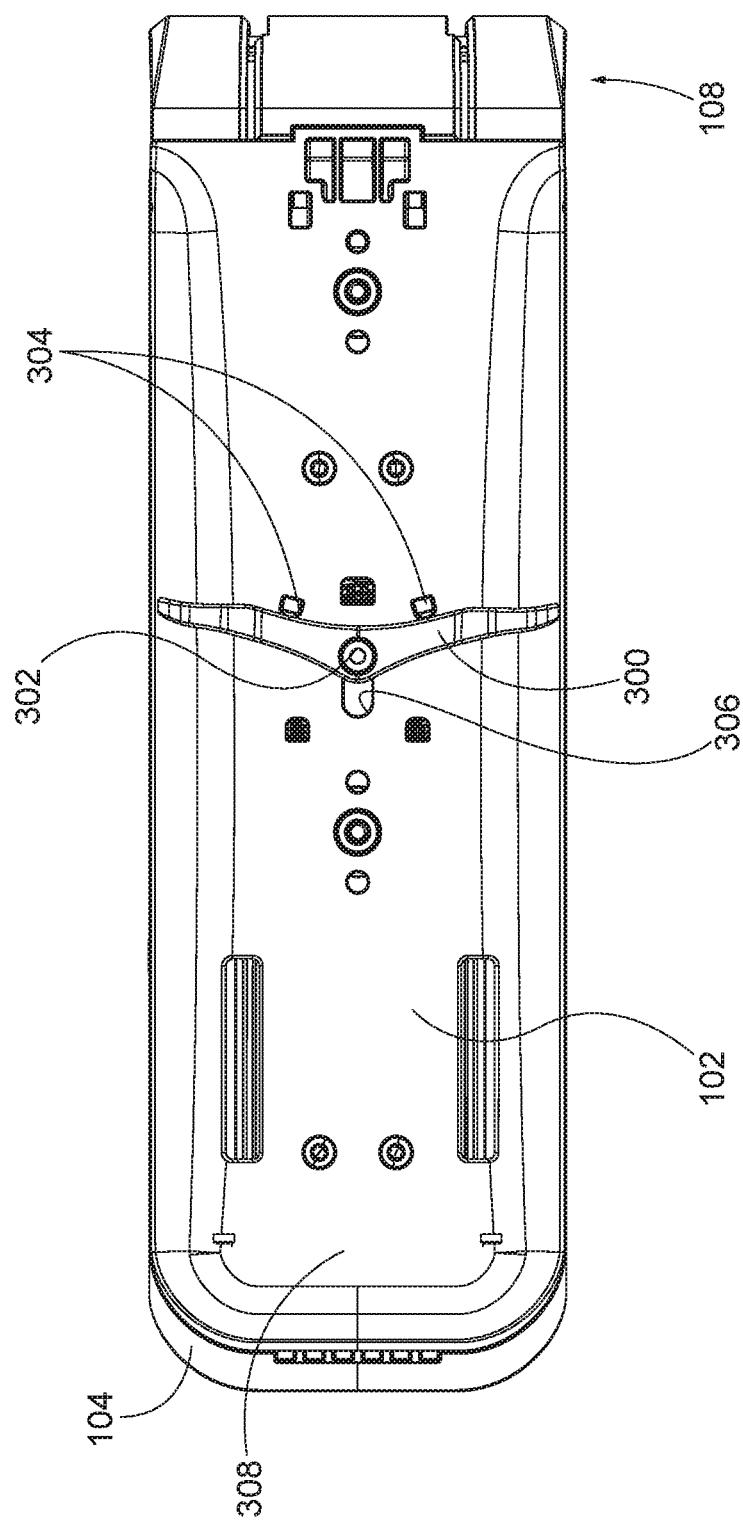
FIG. 6B is a bottom view of a second embodiment of the equipment rack in a closed configuration with the latch actuator in the released position.

In the views depicted in FIGS. 6A and 6B, the actuator 300 is depicted in a released position when no user-applied force is acting on the actuator 300. In this embodiment the actuator 300 returns to or remains in this position unless a user applies a force to it. As will be described in more detail with respect to later figures, the key 212 may be in the latched or unlatched position when the actuator lever 300 is in this position, depending on the position of the other components of the rack assembly. In this embodiment the traveling pin 302 attaches to a shuttle assembly, described in relation to later figures, which operably connects the lever actuator 300 to the key 212.

Figure 7A:
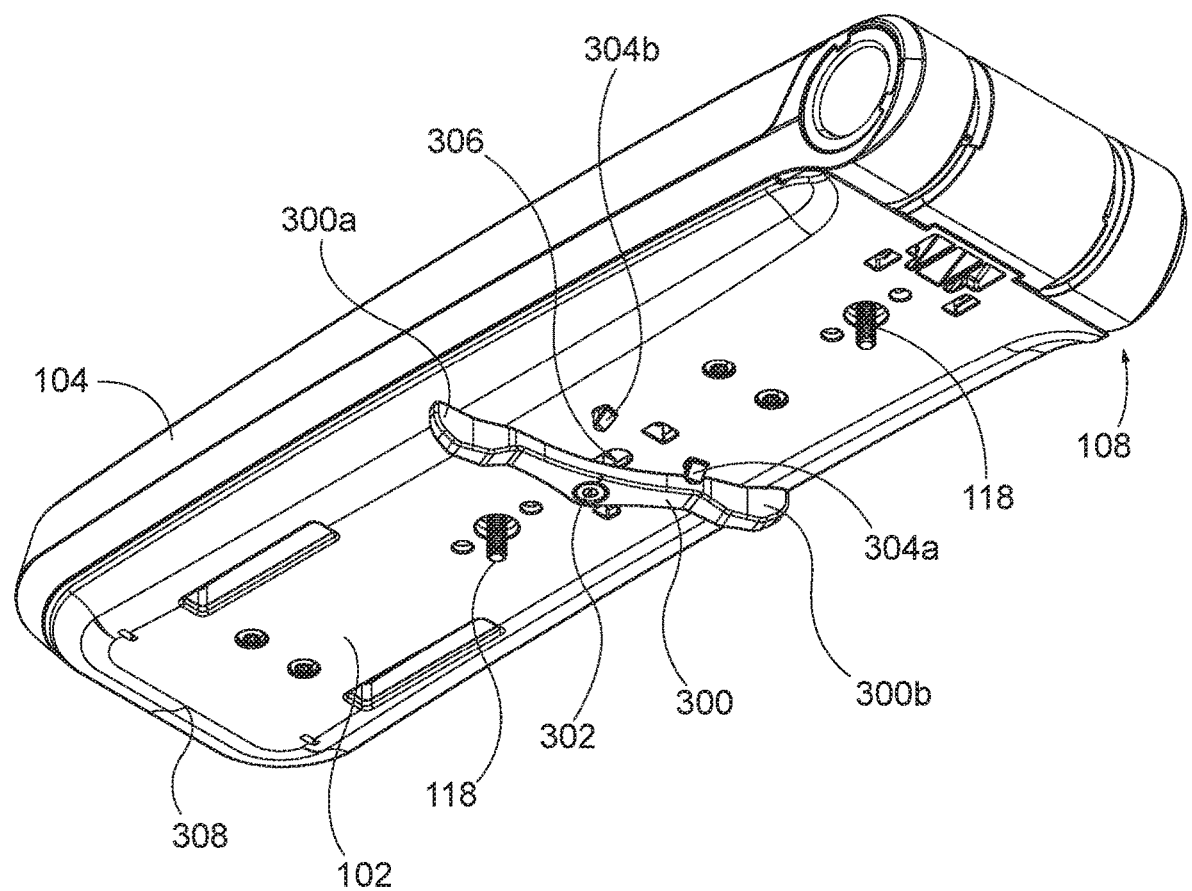
FIG. 7A is a perspective view of a second embodiment of the equipment rack in a closed configuration with the latch actuator in an unlatched position.
Figure 7B:
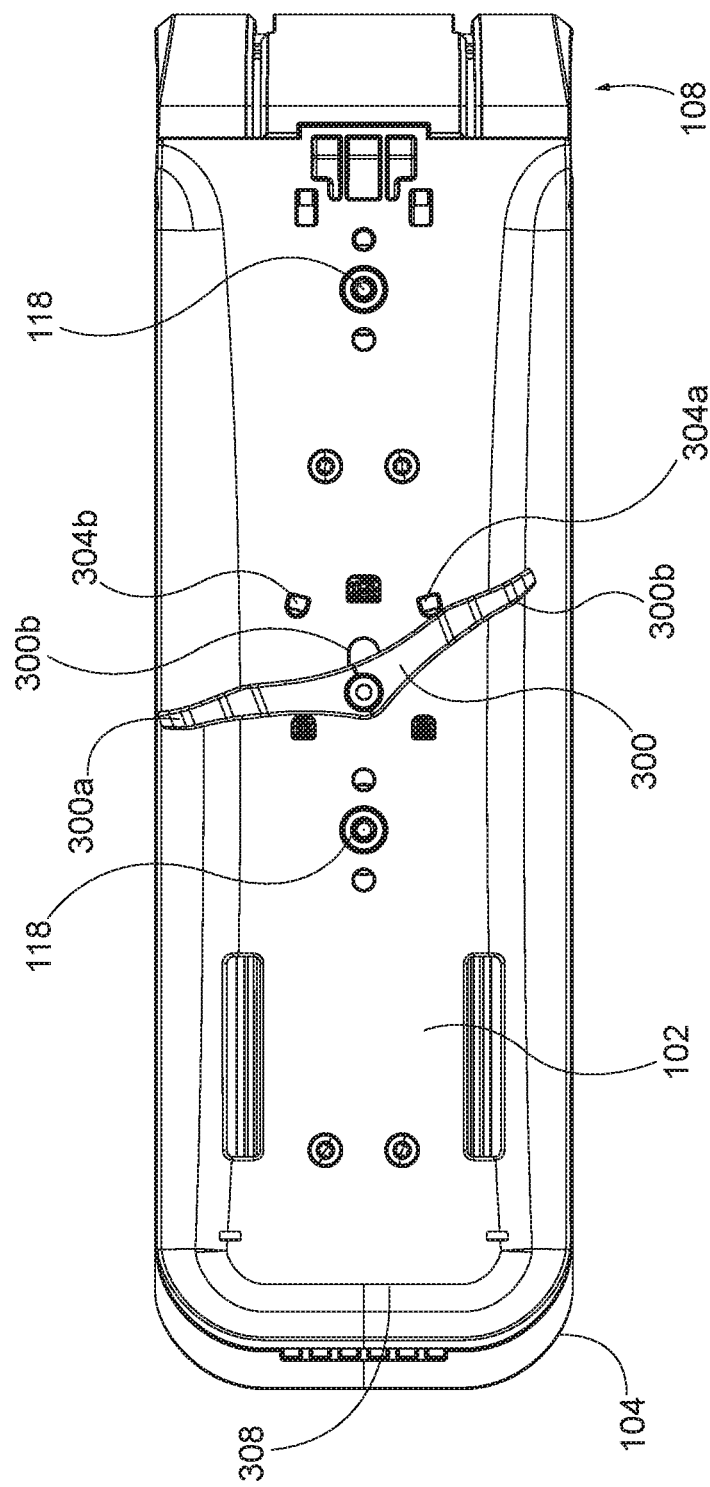
FIG. 7B is a bottom view of a second embodiment of the equipment rack in a closed configuration with the latch actuator in an unlatched position.

In this embodiment if a user applies a force to effort end 300a of this embodiment of the actuator 300 in a direction that is substantially toward the distal end 308 of the base member 102, the actuator 300 will pivot to the position depicted in FIGS. 7A and 7B. The force on effort end 300a of the actuator 300 causes it to pivot around pin 302 until actuator 300 contacts the fulcrum 304a. Then the fulcrum 304a becomes the pivot point for the actuator 300, causing the traveling pin 302 to translate within slot 306, moving the pin 302 away from the hinge assembly 108. In this position the traveling pin 302 operates the mechanism of the shuttle assembly to retract the key 212 away from the hinge assembly 108. If the key 212 is disposed in groove 208 then it will be retracted from the groove 208 by operation of the lever actuator 300 as shown in FIGS. 7A and 7B. In other embodiments of the inventive device, differing configurations of elements may be utilized to achieve the same function and result.

In the configuration depicted in FIGS. 7A and 7B the feature 304a is acting as the fulcrum of lever 300, and the output force of the lever is transmitted through traveling pin 302 which translates in slot 306 toward the distal end 308 of base member 102. In this embodiment the actuator 300 may be operated by applying the effort force to end 300b as well, in which case the actuator 300 pivots in the opposite direction and feature 304b acts as the fulcrum. This allows the latch mechanism to be operated from either side of the rack 100. In some embodiments the actuator 300 may only be operable from one side of the rack 100, and in some of those embodiments the actuator 300 may be pivotally attached to the base member 102 at one of the fulcrum points instead of utilizing the fulcrum features 304. In other embodiments of the rack 100 the actuator 300 may be linearly translatable in the same manner and direction as the traveling pin 302. In some embodiments the pin 302 may be a fixed member that acts as a handle. In some embodiments a user may insert a finger or hand through slot 306 to actuate the shuttle assembly.

FIGS. 8A through 8D depict a bottom view of the second embodiment of the rack 100 with the bottom of base member 102 cut away so that the internal components of the shuttle assembly and latch mechanism are visible. These figures depict the embodiment of the latch mechanism in engaged and disengaged positions when the rack 100 is both open and closed. In this embodiment the actuator arms 220 are connected to the actuator 300 using a two-part shuttle system. In varying embodiments, the shuttle assembly allows the actuator to return to the same released position shown in FIGS. 6A and 6B when the latch mechanism is engaged or disengaged. Thus, when the actuator is operated by a user the shuttle assembly disengages the latch mechanism and returns to the released position, even if the latch mechanism remains in the disengaged configuration.

Figure 8A:
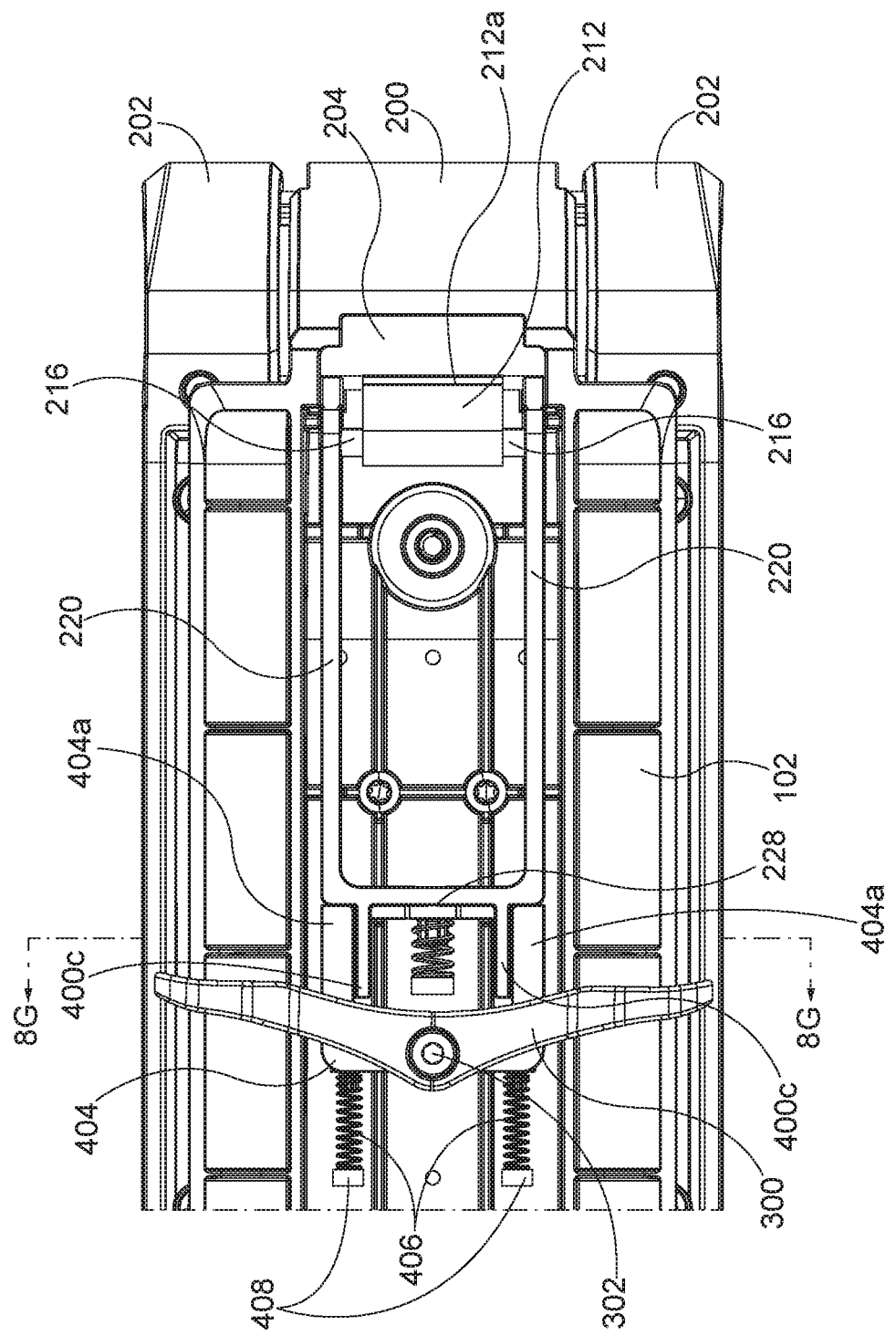
FIG. 8A is a bottom cut-away view of a portion of the second embodiment of the equipment rack in a closed configuration with the latch actuator in the released position.

In the depicted embodiment a primary shuttle component 400 and a secondary shuttle component 404 operably connect the actuator arms 220 to the actuator 300. FIG. 8E depicts a perspective view of the rack 100 with the bottom of the base member 102 removed to show the internal components of this embodiment of the latch mechanism. FIG. 8F depicts the components of an embodiment of the latch mechanism in an exploded view. FIG. 8G depicts a cross-sectional view of the second embodiment of the rack 100 in a closed position along the axis 8G-8G depicted on FIG. 8A.

In this second embodiment, the actuator 300 and shuttle components 400 and 404 replace the connection of the actuator arms 220 to handle 112 in the first embodiment. In some embodiments a combination of the handle 112 and the shuttle components 400 and 404 may be used to operate the latch mechanism. For example, in some embodiments, the secondary shuttle component 404 may be connected to a handle 112 at a distal end of the base member 102. In this second depicted embodiment the user's movement of the actuator 300 causes a translation of pin 302, which in turn translates the secondary shuttle component 404 in a desired direction. The secondary shuttle component 404 then interacts with and may cause translation of the primary shuttle component to engage or disengage the key 212 from groove 206 or operate any other latch mechanism used by hinge assembly 108.

In the second embodiment of the rack 100, the primary shuttle component 400 is one or more arms 400 attached to the cross member 228 that connects the two actuator arms 220. In other embodiments there may be more or fewer actuator arms 220, and the cross bar 228 may be replaced with another functional member or dispensed with entirely. For example, in one embodiment a single actuator arm 220 may have a single shuttle arm 400a attached to it on the opposite end of the arm from the slot 221. In the depicted version of the second embodiment the crossbar 228, actuator arms 220, pin 216, biasing mechanism 232, guide structures 234, and key 212 operate in the same manner as described in relation to the first embodiment.

In some embodiments such as the second embodiment, the primary shuttle component and the secondary shuttle component slidably engage to retract the key 212 from the groove 208. In the second embodiment, the primary shuttle component 400 is provided with at least one shuttle arm 400a extending toward the secondary shuttle component 404. Similarly, in the second embodiment the secondary shuttle component 402 is provided with at least one shuttle arm 404a to slidably engage a shuttle arm 400a on the primary shuttle component 400. In the second embodiment of the rack the engagement between the two arms 400a and 404a comprises a protrusion or tooth 400b and 404b on each shuttle arm 400a or 404a, respectively. In other embodiments the shuttle arms 400a or 404a may be removed, and the protrusions 400b and 404b overlap or interact with the crossbar 228 or the secondary shuttle 404 directly.

In some embodiments, walls 400c and 404c may be provided to properly align the shuttle arms 400 and 404 during use. In the second embodiment the guide walls 400c extend downwardly from the shuttle arm 400a and are disposed adjacent to the medial surface of shuttle arm 404a. Similarly, guide walls 404c extend upwardly from shuttle arms 404a and are disposed adjacent to the lateral surface of shuttle arm 400a. The relative position of these surfaces is depicted in the cross-sectional view in FIG. 8G. In various embodiments the orientation of the shuttle arms 400 and 404 may be reversed, rotated 90 or 180 degrees, or otherwise reoriented, without departing from the scope of the inventive design.

In the second embodiment the shuttle arms 400 and 404 are paired so that the protrusions 400b and 404b will contact each other when the secondary shuttle component 404 translates away from the primary shuttle component 400. Once the protrusions 400b and 404b contact one another, they will then pull the primary shuttle component 400 and the actuator arms 220 in the same direction and away from the hinge assembly 108. In this embodiment the protrusions 400b and 404b are positioned on arms 400a and 404a, respectively, so that the secondary shuttle member 404 may return to its released position (as shown in FIG. 8A) even when the primary shuttle member 400 is not free to translate toward the hinge assembly 108 (in this case because the key 212 is not aligned with the groove 208 when the support member 104 is in the closed position). The location of the protrusions 400b and 404b on the arms 400a and 404a, respectively, or the lengths of arms 400a and 404a may be adjusted in various embodiments as necessary to provide the required translation of the actuator arms 220 and disengagement of the latch mechanism from hinge assembly 220.

FIG. 8A depicts the rack 100 in a closed position with the support member 104 folded down into the stowed position, and with the latch in a released position without a user-applied force. In this view the key 212 has not been able to translate further forward, despite the biasing mechanism of spring 232, because the protrusion 212a is not aligned with a groove or hole in hinge cylinder 204. Protrusion 212a rests on the outer surface of hinge cylinder 204. However, the secondary shuttle component 400 is still urged toward hinge assembly 108 by the biasing mechanism of springs 406 pushing against the features 408 of base member 102. The secondary shuttle component 404 is translated toward the primary shuttle component 400 until the ends of the shuttle arms 404a contact the crossbar 228 or the actuator 300 contacts both of the fulcrum features 304 (not shown in FIG. 8A due to cut-away of base member 102), or both. In this position there is a gap between protrusions 400b and 404b in each pair of arms 400 and 404 which is not visible in FIG. 8A because the protrusions are within a cavity formed by the arms 400a and 404a, and the walls 400c and 404c.

Figure 8B:
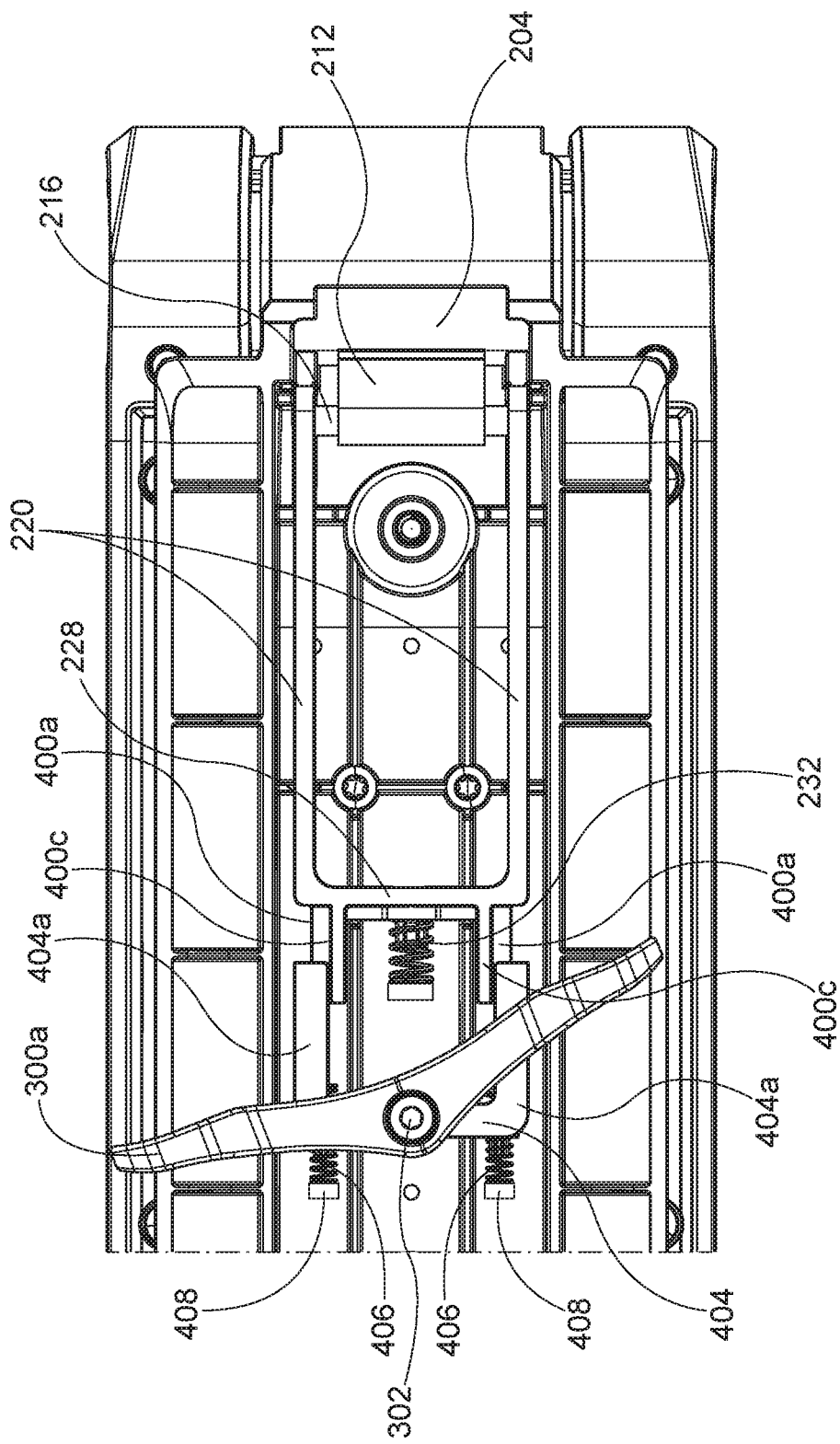
FIG. 8B is a bottom cut-away view of a portion of the second embodiment of the equipment rack in a closed configuration with the latch actuator in an unlatched position.

Referring now to FIG. 8B, a user-applied effort force has been applied to lever end 300a of actuator 300 causing it to pivot on fulcrum feature 304a (not visible in FIG. 8B). The pivoting of actuator 300 translates pin 302 which is connected to secondary shuttle member 404 and translates it away from hinge assembly 108. The user-applied effort force compresses the springs 406. Once the protrusions 404b come in contact with protrusions 400b then shuttle arms 400 begin to translate away from hinge assembly 108, compressing spring 232 and pulling key 212 away from hinge cylinder 204. The extent of the translation may be set by stop elements on base member 102 interacting with one of the shuttle components or crossbar 228, or the length of the slot 306 for the traveling pin 302. In varying embodiments of the device, the translation will be sufficient to disengage the latch mechanism, if it is engaged in the closed position, so that the arm 104 may be pivoted upwardly.

Figure 8C:
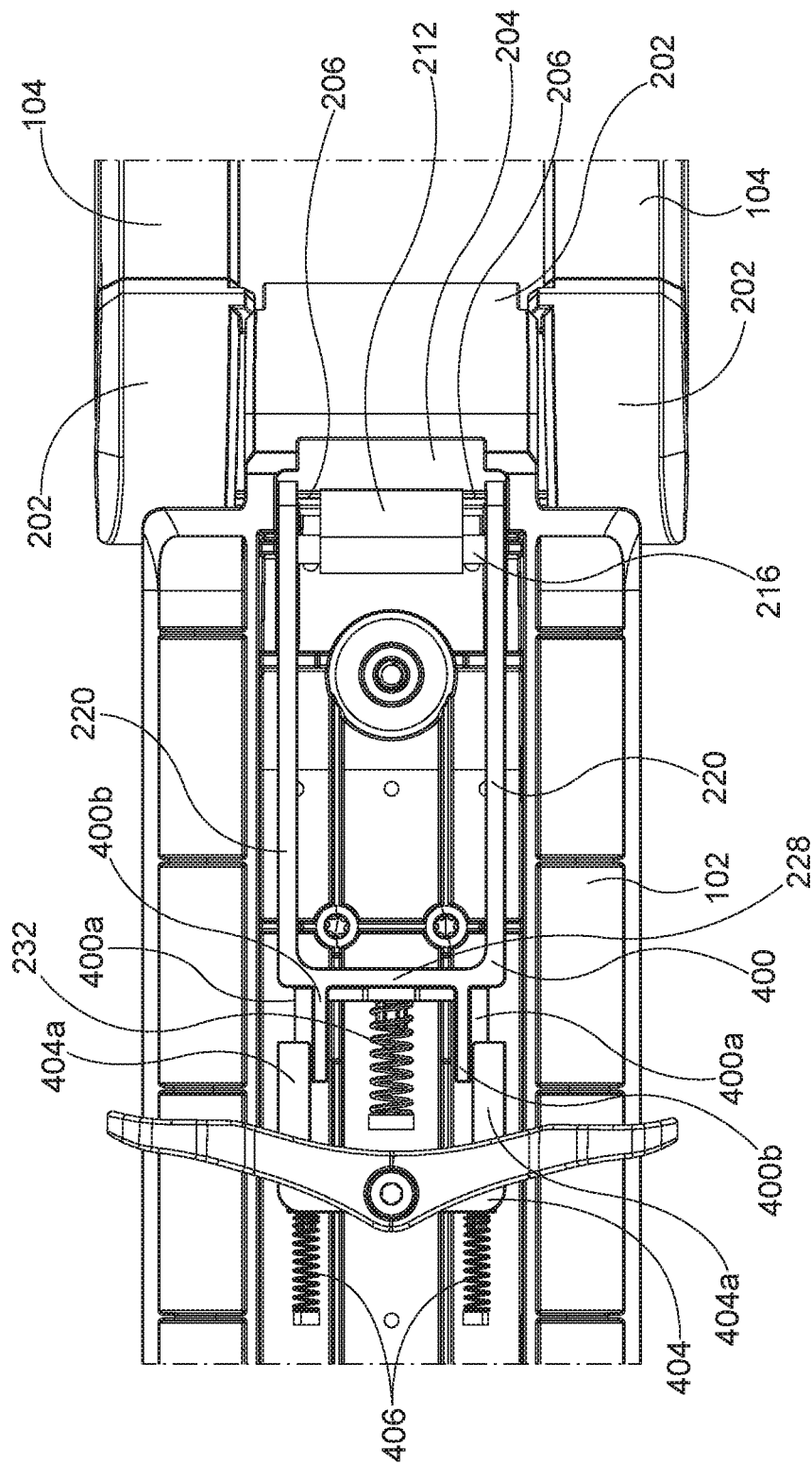
FIG. 8C is a bottom cut-away view of a portion of the second embodiment of the equipment rack in an open configuration with the latch actuator in the released position.

FIG. 8C depicts the second embodiment of the rack 100 with the support member 104 in the open position. In this embodiment the key 212 is aligned with groove 206 and protrusion 212a is inserted into the groove 212 by the force of biasing mechanism spring 232 on crossbar 228. The biasing mechanism of springs 406 also push secondary shuttle component 404 toward hinge assembly 108 and translate actuator 300 to the released position. The limit of the forward movement of the secondary shuttle component 404 and the actuator 300 may be limited by slot 306 or some component of base member 102, for example the fulcrum features 304.

Figure 8D:
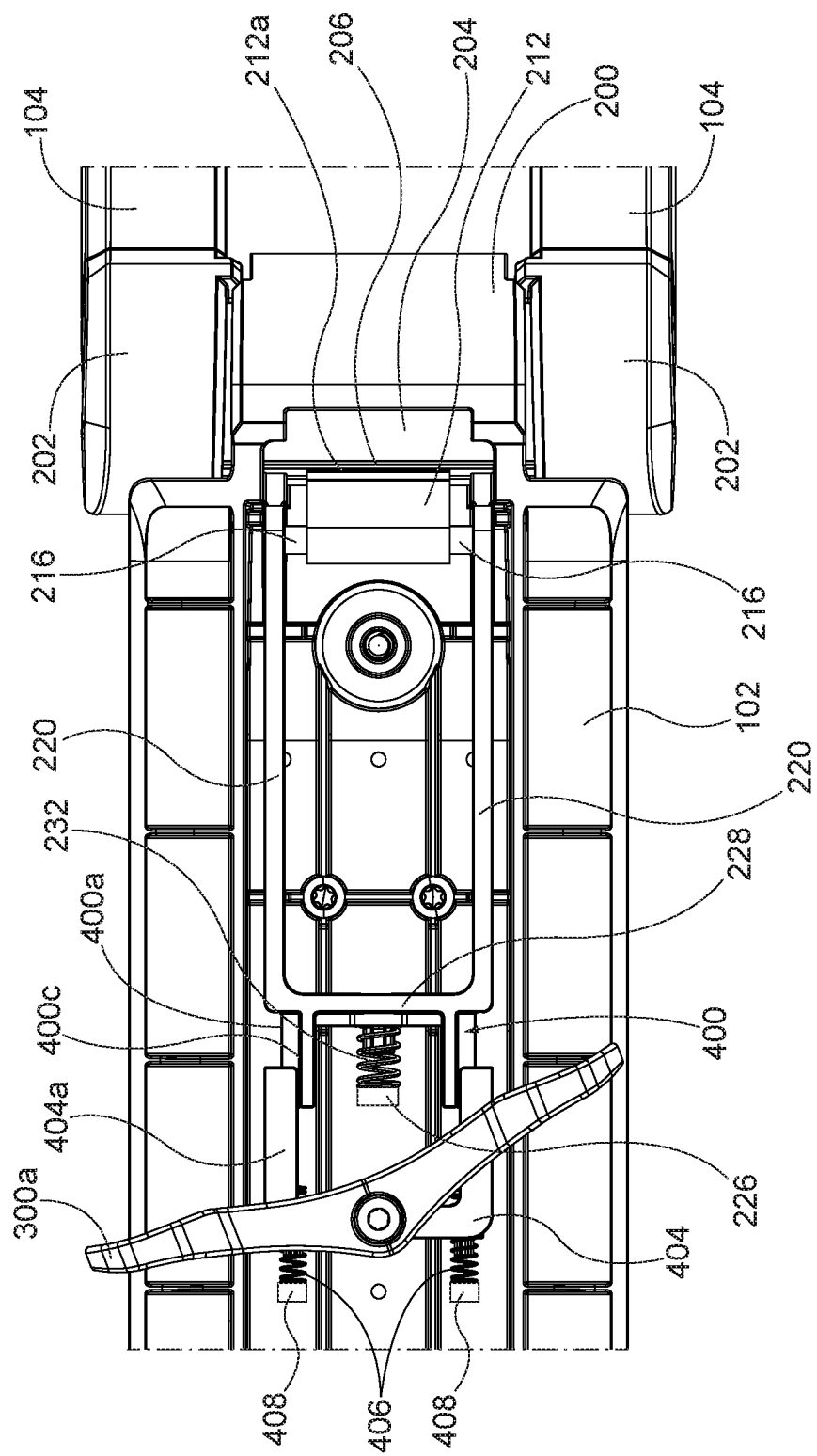
FIG. 8D is a bottom cut-away view of a portion of the second embodiment of the equipment rack in an open configuration with the latch actuator in an unlatched position.
Figure 8E:
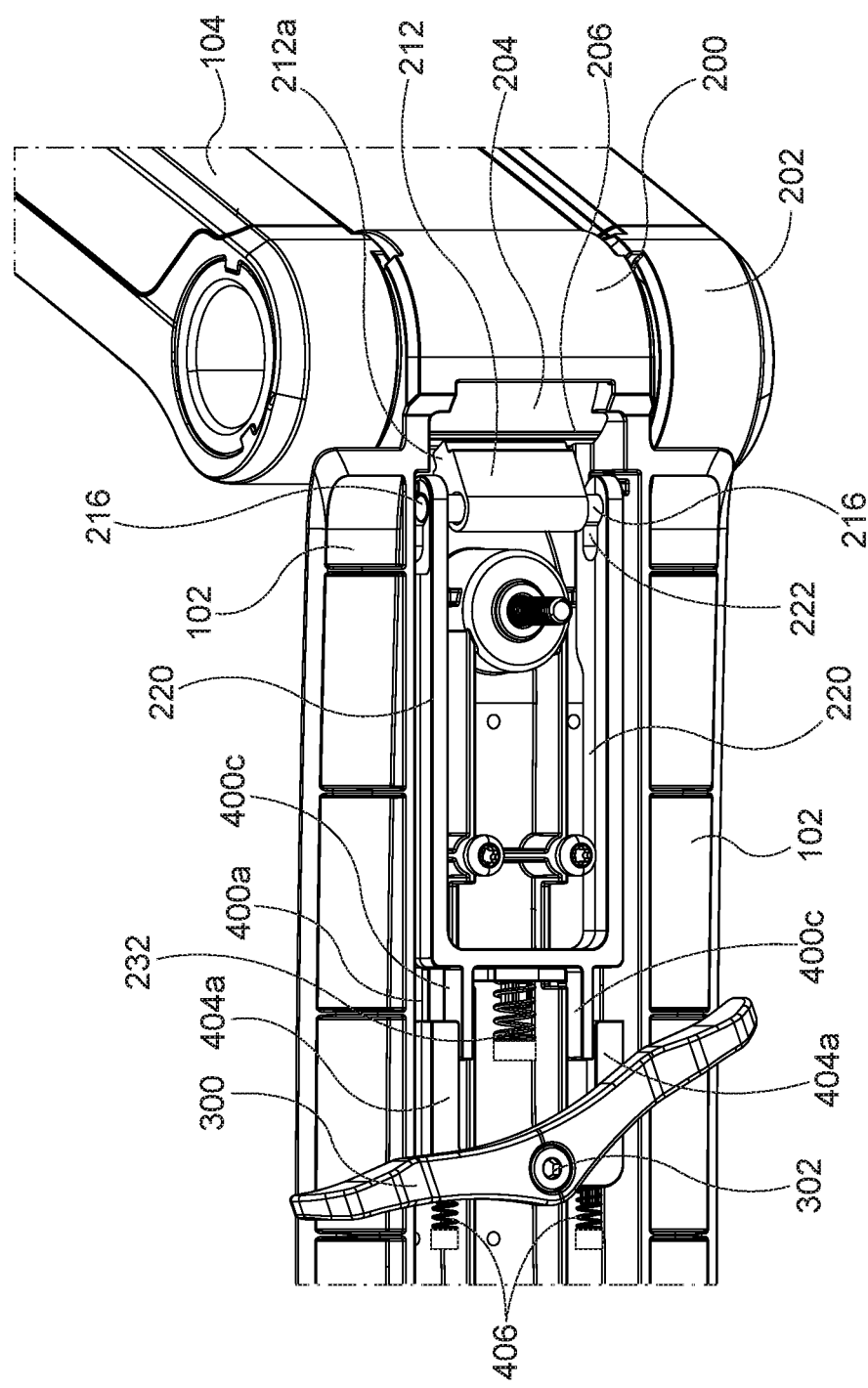
FIG. 8E is a bottom perspective cut-away view of a portion of the second embodiment of the equipment rack in an open configuration with the latch actuator in an unlatched position.
Figure 8F:
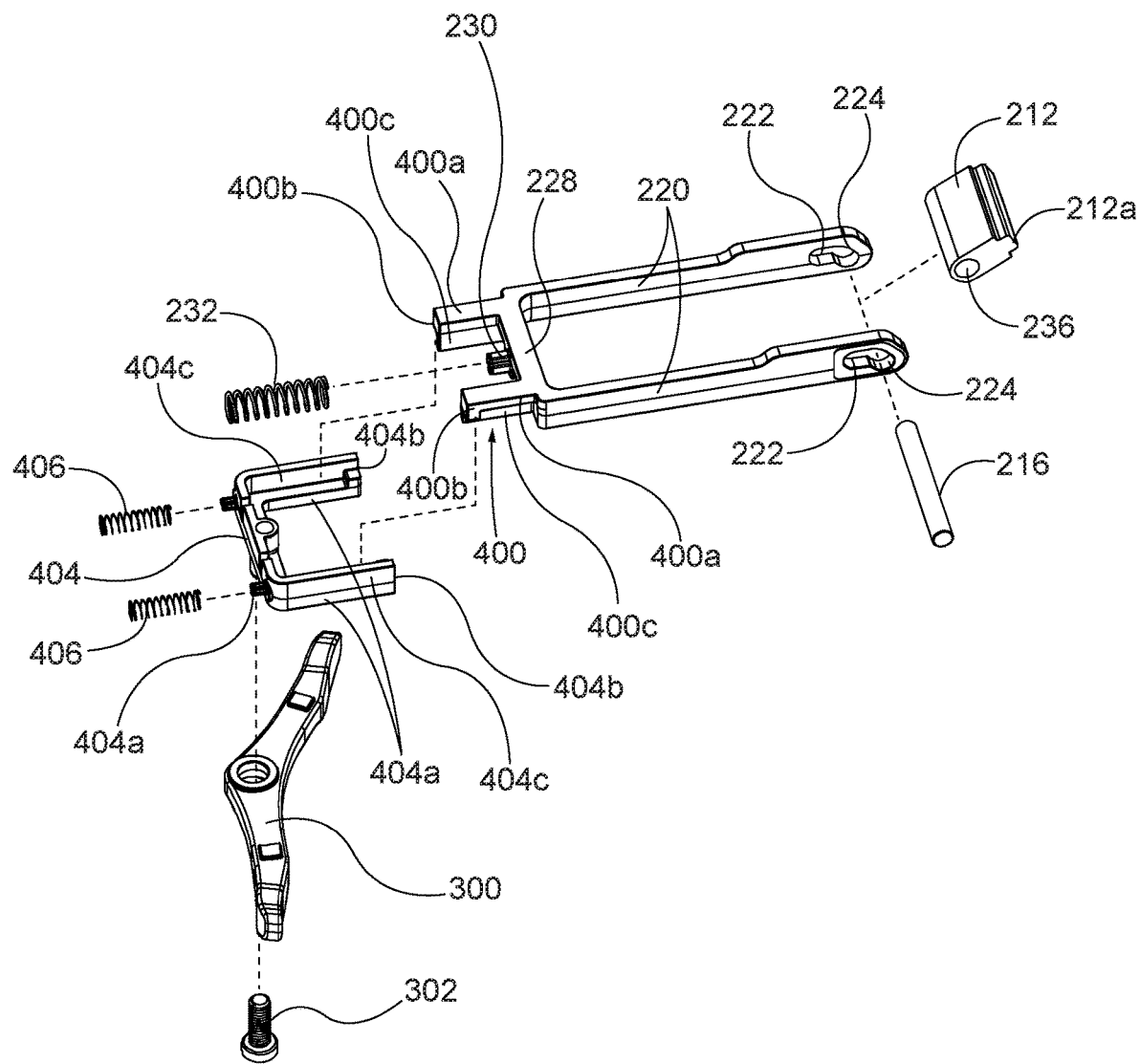
FIG. 8F is an exploded view of a portion of the second embodiment of the equipment rack.
Figure 8G:
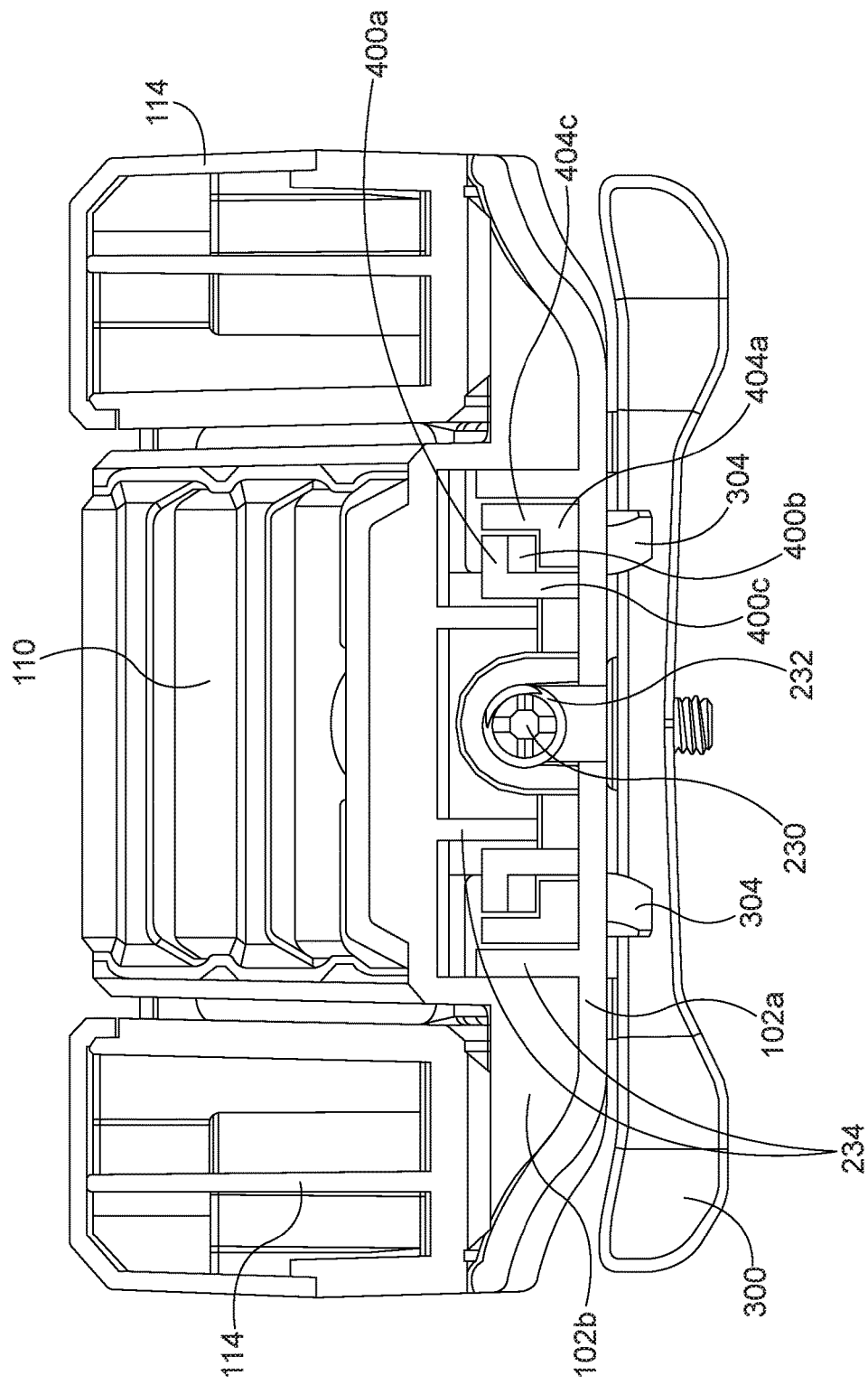
FIG. 8G is a cross-sectional view of the second embodiment of the equipment rack in a closed configuration on axis 8G-8G shown in FIG. 8A.

FIG. 8D depicts the second embodiment of the rack 100 with the support member 104 in the open position. In this depiction a user-applied effort force on lever 300a has pivoted it from the released position shown in FIG. 8C. The pivotal movement of lever 300 translates pin 302 and secondary shuttle member 404 away from the hinge assembly 108 and compresses springs 406 against fixed members 408. The protrusions 404b engage protrusions 400b and pull the primary shuttle component 400 and actuator arms 220 away from the hinge assembly 108. As described with reference to the first embodiment, the movement of the actuator arms 220 causes the pin 216 to move into the angled section of slot 221 which pulls key 212 away from hinge cylinder 204 and withdraws protrusion 212a from the groove 206. In this position the support member 104 may be pivoted around the hinge assembly 108. FIG. 8E depicts the second embodiment of the rack in the same position as FIG. 8D but in a perspective view. The user may release the actuator 300 as soon as the protrusion 212a is no longer aligned with a groove 206, and the support member 104 may pivot until the protrusion realigns with a groove 206 and the biasing mechanism 232 causes the protrusion 212a to insert into the groove.

Referring now to FIG. 8G, a cross-sectional view of the second embodiment of the rack 100 is shown along the axis 8G-8G on FIG. 8A. The shuttle arms 400a and 404a, and optional guide walls 400c and 404c create channels in which the protrusions 400b and 404b engage each other when the shuttle components 400 and 404 slide in relation to one another. In this embodiment, base member 102 comprises a lower member 102a and an upper member 102b that create a cavity for holding many of the latch mechanism components. The guide structures 234 of the base member 102 keep the components of the latch mechanism in the proper relationship to one another and also provide fixed bases for components such as the biasing mechanisms 232 and 408.

In varying embodiments of the rack, the components may be formed from a variety of different materials such as various kinds of plastics, metals such as aluminum or steel, or composite materials.

Changes may be made in the above methods, devices, and structures without departing from the scope hereof. Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An equipment rack comprising:
a base member;
a support member pivotally attached to the base member by a hinge assembly;
a shuttle assembly configured to disengage the support member from a locked position with respect to the base member;
wherein the shuttle assembly comprises a first shuttle component moveably engaged to a second shuttle component such that movement of the second shuttle component and the first shuttle component disengages the support member from the locked position;
the second shuttle component is configured to disengage from the first shuttle component.

2. The equipment rack of claim 1 wherein the shuttle assembly further comprises a biasing mechanism to disengage the second shuttle component from the first shuttle component.

3. The equipment rack of claim 1 wherein the first shuttle component comprises an arm having a protrusion, the second shuttle component comprises an arm having a protrusion; wherein the protrusion on the second shuttle component engages the protrusion on the first shuttle component.

4. The equipment rack of claim 1 wherein the latch mechanism comprises a key having a protrusion for engaging a groove in the hinge assembly.

5. The equipment rack of claim 4 wherein the first shuttle component is configured to retract the key from the groove in the hinge assembly, and wherein the support member can pivot when the protrusion of the key is retracted from the groove.

6. The equipment rack of claim 5 wherein the first shuttle component further comprises an angled slot coupled to the key.

7. The equipment rack of claim 6 wherein the key is slidably disposed in the base member.

8. The equipment rack of claim 1 further comprising an actuator, wherein movement of the actuator from a first position to a second position operates the shuttle assembly to disengage the support member from a locked position.

9. The equipment rack of claim 8 wherein the shuttle assembly is configured to move the actuator from the second position to the first position while the support member is disengaged from the locked position.

10. An equipment rack comprising:
a base member;
a support member pivotally attached to the base member by a hinge assembly;
a shuttle member configured to disengage the support member from a locked position with respect to the base member;
an actuator handle attached to the shuttle member;
wherein the actuator handle is pivotally attached to the shuttle member.

11. The equipment rack of claim 10 further comprising a fulcrum feature configured to act as a fulcrum for the actuator handle.

12. The equipment rack of claim 11 wherein pivoting the actuator handle around the fulcrum feature translates the shuttle assembly and disengages the support member from a locked position.

13. An equipment rack comprising:
a base member;
a support member pivotally attached to the base member by a hinge assembly;
a shuttle member configured to disengage the support member from a locked position with respect to the base member;
further comprising a latch mechanism comprising a key having a protrusion for engaging a groove in the hinge assembly.

14. The equipment rack of claim 13 wherein the shuttle member is configured to retract the key from the groove in the hinge assembly, and wherein the support member can pivot when the protrusion of the key is retracted from the groove.

15. The equipment rack of claim 13 wherein the shuttle member further comprises a slot coupled to the key.

16. The equipment rack of claim 13 wherein a portion of a lengthwise dimension of the slot is disposed at an angle to the translation of the shuttle member.

17. An equipment rack comprising:
a base member, a support member pivotally attached to the base member by a hinge, a latch mechanism for the hinge, and an actuator for disengaging the latch mechanism via a shuttle member;
wherein the shuttle member is configured to disengage from the actuator when the latch mechanism is disengaged.

18. The equipment rack of claim 17 wherein the shuttle member engages the actuator when the latch mechanism is engaged.

19. The equipment rack of claim 17 further comprising a biasing mechanism to translate the actuator to a closed position when not actuated by a user.

20. The equipment rack of claim 17 wherein a protrusion on the actuator engages a protrusion on the shuttle member.

* * * * *